(12) United States Patent
Martinez et al.

(10) Patent No.: US 12,226,877 B2
(45) Date of Patent: Feb. 18, 2025

(54) ABRASIVE ARTICLE

(71) Applicant: 3M INNOVATIVE PROPERTIES COMPANY, St. Paul, MN (US)

(72) Inventors: Jaime A. Martinez, Kissimmee, FL (US); Caroline E. Morel, St. Paul, MN (US); Junting Li, Woodbury, MN (US); Michael J. Annen, Hudson, WI (US); Deborah J. Eilers, Hasting, MN (US); Daniel A. Billig, Maplewood, MN (US); Carlos A. Barrios, Frisco, TX (US); Monika E. Frendt, Cottage Grove, MN (US); Victor A. Cárdenas, Lima (PE); Yuyang Liu, St. Paul, MN (US); Dwight D. Erickson, Woodbury, MN (US); Brian G. Koethe, Cottage Grove, MN (US); Ann M. Hawkins, Lake Elmo, MN (US); Jing Zhang, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 573 days.

(21) Appl. No.: 17/310,534

(22) PCT Filed: Feb. 7, 2020

(86) PCT No.: PCT/IB2020/050984
§ 371 (c)(1),
(2) Date: Aug. 9, 2021

(87) PCT Pub. No.: WO2020/165709
PCT Pub. Date: Aug. 20, 2020

(65) Prior Publication Data
US 2022/0152783 A1    May 19, 2022

Related U.S. Application Data

(60) Provisional application No. 62/945,242, filed on Dec. 9, 2019, provisional application No. 62/851,765, filed
(Continued)

(51) Int. Cl.
*B24D 11/00* (2006.01)
*B24D 3/00* (2006.01)
(Continued)

(52) U.S. Cl.
CPC ............ *B24D 11/001* (2013.01); *B24D 3/002* (2013.01); *B24D 3/007* (2013.01); *B24D 3/28* (2013.01);
(Continued)

(58) Field of Classification Search
CPC ...... B24D 11/001; B24D 3/002; B24D 3/007; B24D 3/28; B24D 18/0072; C09K 3/1409
See application file for complete search history.

(56) References Cited

U.S. PATENT DOCUMENTS

| 4,118,531 A | 10/1978 | Hauser |
| 4,215,682 A | 8/1980 | Kubik |

(Continued)

FOREIGN PATENT DOCUMENTS

| WO | WO 2012-112305 | 8/2012 |
| WO | WO 2015-100018 | 7/2015 |

(Continued)

OTHER PUBLICATIONS

International Search Report for PCT International Application No. PCT/IB2020/050984, mailed on May 11, 2020, 4 pages.

*Primary Examiner* — Pegah Parvini
(74) *Attorney, Agent, or Firm* — Kathleen B. Gross; Katherine M. Scholz

(57) ABSTRACT

The disclosure relates to an abrasive article comprising: a fabric substrate comprising strands forming first void spaces
(Continued)

between the strands; a laminate joined to the fabric substrate; a cured resin composition joined to the laminate opposite the fabric substrate; abrasive particles joined to the cured resin composition; and a plurality of second void spaces extending through the laminate coinciding with first void spaces in the fabric substrate. The disclosure also relates to methods of making such abrasive articles.

19 Claims, 24 Drawing Sheets

Related U.S. Application Data on May 23, 2019, provisional application No. 62/803,871, filed on Feb. 11, 2019.

(51) Int. Cl.
  *B24D 3/28* (2006.01)
  *B24D 18/00* (2006.01)
  *C09K 3/14* (2006.01)
(52) U.S. Cl.
  CPC ........ *B24D 18/0072* (2013.01); *C09K 3/1409* (2013.01)

(56) References Cited

U.S. PATENT DOCUMENTS

| | | | |
|---|---|---|---|
| 4,314,827 A | 2/1982 | Leitheiser | |
| 4,623,364 A | 11/1986 | Cottringer | |
| 4,652,275 A | 3/1987 | Bloecher | |
| 4,744,802 A | 5/1988 | Schwabel | |
| 4,770,671 A | 9/1988 | Monroe | |
| 4,799,939 A | 1/1989 | Bloecher | |
| 4,848,041 A | 7/1989 | Kruschke | |
| 4,881,951 A | 11/1989 | Monroe | |
| 5,152,917 A | 10/1992 | Pieper | |
| 5,201,916 A | 4/1993 | Berg | |
| 5,213,591 A | 5/1993 | Celikkaya | |
| 5,372,620 A | 12/1994 | Rowse | |
| 5,435,816 A | 7/1995 | Spurgeon | |
| 5,436,063 A * | 7/1995 | Follett | B24D 3/28 428/326 |
| RE35,570 E | 7/1997 | Rowenhorst | |
| 5,672,097 A | 9/1997 | Hoopman | |
| 5,674,122 A | 10/1997 | Krech | |
| 5,946,991 A | 9/1999 | Hoopman | |
| 5,975,987 A | 11/1999 | Hoopman | |
| 5,984,998 A | 11/1999 | Ottesen | |
| 6,129,540 A | 10/2000 | Hoopman | |
| 6,372,001 B1 | 4/2002 | Omar et al. | |
| 8,034,137 B2 | 10/2011 | Erickson | |
| 8,142,531 B2 | 3/2012 | Adefris | |
| 8,142,532 B2 | 3/2012 | Erickson | |
| 8,142,891 B2 | 3/2012 | Culler | |
| 9,616,551 B2 | 4/2017 | Meana-Esteban | |
| 9,630,297 B2 | 4/2017 | Janssen et al. | |
| 9,751,192 B2 | 9/2017 | Sharmila | |
| 2002/0182955 A1 | 12/2002 | Weglewski | |
| 2003/0121212 A1 | 7/2003 | Minick | |
| 2006/0148390 A1 | 7/2006 | Woo | |
| 2007/0028525 A1* | 2/2007 | Woo | B24D 11/02 451/526 |
| 2008/0236051 A1 | 10/2008 | Schwabel | |
| 2009/0165394 A1 | 7/2009 | Culler | |
| 2009/0169816 A1 | 7/2009 | Erickson | |
| 2009/0229188 A1 | 9/2009 | Hoglund | |
| 2012/0227333 A1 | 9/2012 | Adefris | |
| 2013/0040537 A1 | 2/2013 | Schwabel | |
| 2013/0125477 A1 | 5/2013 | Adefris | |
| 2013/0344786 A1 | 12/2013 | Keipert | |
| 2014/0290147 A1* | 10/2014 | Seth | B24D 11/04 51/298 |
| 2015/0267097 A1 | 9/2015 | Rosenflanz | |
| 2015/0343605 A1 | 12/2015 | Hoglund | |
| 2017/0058254 A1 | 3/2017 | Schulz-Raffelt | |
| 2019/0270922 A1 | 9/2019 | Adefris | |
| 2019/0275641 A1 | 9/2019 | Nienaber | |
| 2019/0283216 A1 | 9/2019 | Lukowski | |

FOREIGN PATENT DOCUMENTS

| | | | |
|---|---|---|---|
| WO | WO 2015-100020 | 7/2015 | |
| WO | WO 2015-100220 | 7/2015 | |
| WO | WO 2016-028683 | 2/2016 | |
| WO | WO 2016-089675 | 6/2016 | |
| WO | WO 2016-205133 | 12/2016 | |
| WO | WO 2016-205267 | 12/2016 | |
| WO | WO 2017-007703 | 1/2017 | |
| WO | WO 2017-007714 | 1/2017 | |
| WO | WO 2018-063958 | 4/2018 | |
| WO | WO 2018-063960 | 4/2018 | |
| WO | WO 2018-063962 | 4/2018 | |
| WO | WO 2018-080703 | 5/2018 | |
| WO | WO 2018-080704 | 5/2018 | |
| WO | WO 2018-080705 | 5/2018 | |
| WO | WO 2018-080755 | 5/2018 | |
| WO | WO 2018-080756 | 5/2018 | |
| WO | WO 2018-080765 | 5/2018 | |
| WO | WO 2018-080784 | 5/2018 | |
| WO | WO 2018-080799 | 5/2018 | |
| WO | WO 2018-081246 | * 5/2018 | ............ C04B 35/111 |
| WO | WO 2018-118688 | 6/2018 | |
| WO | WO 2018-118690 | 6/2018 | |
| WO | WO 2018-118699 | 6/2018 | |
| WO | WO 2018-134732 | 7/2018 | |
| WO | WO 2018-136268 | 7/2018 | |
| WO | WO 2018-136269 | 7/2018 | |
| WO | WO 2018-136271 | 7/2018 | |
| WO | WO 2019-102312 | 5/2019 | |
| WO | WO 2019-102328 | 5/2019 | |
| WO | WO 2019-102329 | 5/2019 | |
| WO | WO 2019-102330 | 5/2019 | |
| WO | WO 2019-102331 | 5/2019 | |
| WO | WO 2019-102332 | 5/2019 | |
| WO | WO 2019-167022 | 9/2019 | |
| WO | WO 2020-084483 | 4/2020 | |
| WO | WO 2020-099969 | 5/2020 | |
| WO | WO 2020-100084 | 5/2020 | |
| WO | WO 2020-128716 | 6/2020 | |
| WO | WO 2020-128717 | 6/2020 | |
| WO | WO 2020-128719 | 6/2020 | |
| WO | WO 2020-128720 | 6/2020 | |
| WO | WO 2020-128752 | 6/2020 | |
| WO | WO 2020-128833 | 6/2020 | |
| WO | WO 2020-128838 | 6/2020 | |
| WO | WO 2020-128842 | 6/2020 | |
| WO | WO 2020-128844 | 6/2020 | |
| WO | WO 2020-128845 | 6/2020 | |
| WO | WO 2020-128852 | 6/2020 | |
| WO | WO 2020-128853 | 6/2020 | |
| WO | WO 2020-128854 | 6/2020 | |
| WO | WO 2020-128857 | 6/2020 | |
| WO | WO 2021-186326 | 9/2021 | |

* cited by examiner

ABRASIVE ARTICLE

CROSS REFERENCE TO RELATED APPLICATIONS

This application is a national stage filing under 35 U.S.C. 371 of PCT/IB2020/050984, filed Feb. 7, 2020, which claims the benefit of U.S. Provisional Application No. 62/803,871, filed Feb. 11, 2019, U.S. Provisional Application No. 62/851,765, filed May 23, 2019, and U.S. Provisional Application No. 62/945,242, filed Dec. 9, 2019, the disclosure of which is incorporated by reference in its/their entirety herein.

BACKGROUND

It is very common for dry sanding operations to generate a significant amount of airborne dust. To minimize this airborne dust, it is common to use abrasive discs on a tool while vacuum is drawn through the abrasive disc, from the abrasive side through the backside of the disc, and into a dust-collection system. For this purpose, many abrasives are available with holes converted into them, to facilitate this dust extraction. As an alternative to converting dust-extraction holes into abrasive discs, commercial products exist in which the abrasive is coated onto fibers of a net-type knit backing in which loops are knit into the backside of the abrasive article. The loops serve as the loop-portion of a hook-and-loop attachment system for attachment to a tool. Net type products are known to provide superior dust extraction and/or anti-loading properties, when used with substrates known to severely load traditional abrasives. However, cut and/or life performance are still lacking. Thus, there is a need for a net type product that provides enhanced cut and/or life performance while demonstrating superior dust extraction.

BRIEF DESCRIPTION OF THE DRAWINGS

The drawings illustrate generally, by way of example, but not by way of limitation, various embodiments discussed in the present document.

FIGS. 4A-4I are side cross-sectional views of a portion of an abrasive article according to various embodiments of the present disclosure.

It should be understood that numerous other modifications and examples can be devised by those skilled in the art, which fall within the scope and spirit of the principles of the disclosure. Figures may not be drawn to scale.

DESCRIPTION

Embodiments described herein are directed to an abrasive article that not only retains the dust-extraction advantages of an abrasive on a net-type backing, but also demonstrates abrasive performance (cut and/or life) advantages of a conventional abrasive. This combination of benefits (dust extraction and cut and/or life) is possible because the construction of the abrasive articles described herein allows for pattern-coating abrasive on a fabric-backed laminate to form well-defined areas of abrasive coating as well as open areas devoid of any abrasive coating. The patterned abrasive area can therefore be designed independent of any pattern present on the fabric substrate, to optimize both abrasive performance and dust extraction.

Figure 1:
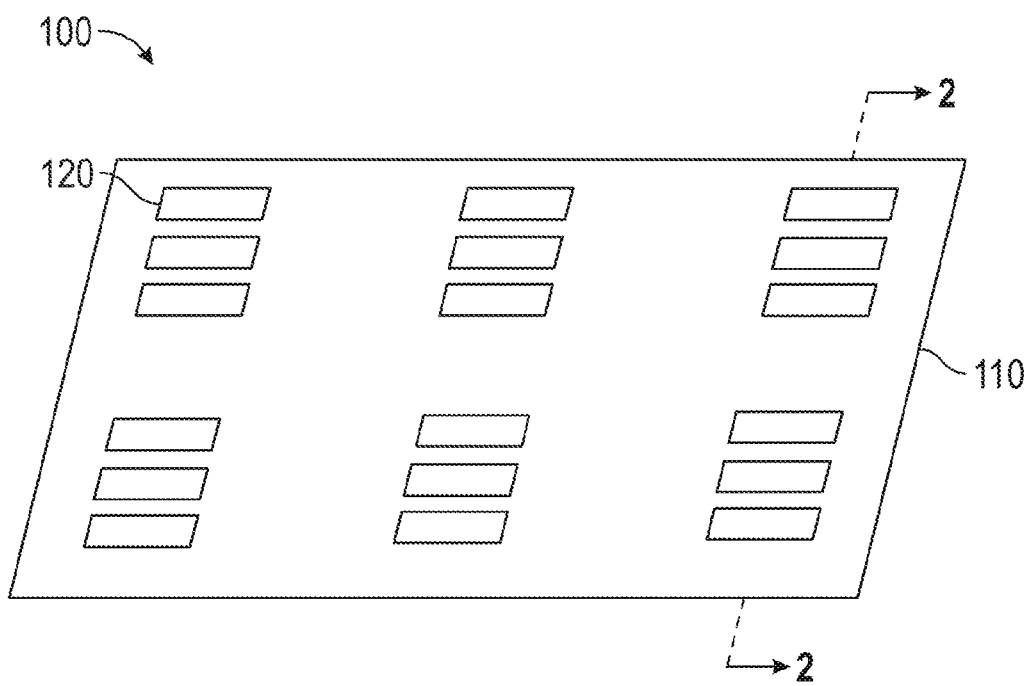
FIG. 1 is a perspective view of an abrasive article according to one example of the present disclosure.

FIG. 1 is a perspective view of one example of an abrasive article referred to by the numeral 100. As shown, the abrasive article 100 includes: a fabric substrate 110 comprising strands forming first void spaces 270 between the strands (see FIG. 2); and an abrasive layer 120 comprising a laminate joined to the fabric substrate 110; a resin joined to the laminate opposite the fabric substrate 110; abrasive particles joined to the resin; and a plurality of void spaces extending through the laminate coinciding with void spaces in the fabric substrate 110. The plurality of void spaces extending through the laminate coinciding with void spaces in the fabric substrate 110 allow for an air flow through the article 100 at a rate of, e.g., at least 0.1 L/s (e.g. at least 0.2 L/s, at least 0.4 L/s, at least 0.6 L/s, at least 1 L/s; or about 0.1 L/s to about 1 L/s, about 0.25 L/s to about 0.75 L/s, about 0.5 L/s to about 1 L/s, about 1 L/s to about 2 L/s, about 1.5 L/s or about 3 L/s), such that, when in use, dust can be removed from an abraded surface through the abrasive article.

FIG. 1 shows a relatively simple pattern that can be created with the abrasive layers 120. But the conceivable patterns are many. For example, abrasive articles 100 having various patterns in the abrasive layer 120 are shown in FIGS. 11-22. As can be seen, the abrasive layers 120 can comprise a plurality of pattern elements 121, which may or may not be repeated across the surface of the abrasive article 100. Each pattern element 121 can be comprised of one or more sub-elements. Different pattern elements 121 within the same abrasive article may be provided with the same or different abrasive particles 250 or other additives (for example, different abrasive grades, blends of abrasive particles 250, fillers, grinding aids, etc.) as desired for a given application. Although the articles depicted are presented in the form of circular discs, it should be understood that abrasive articles could take any form (for example, sheets or belts). FIGS. 11-22 are intended only to depict exemplary patterns of abrasive layers 120, therefore other details of the abrasive articles (e.g., the detail of fabric substrate 110) are not shown.

Figure 2:
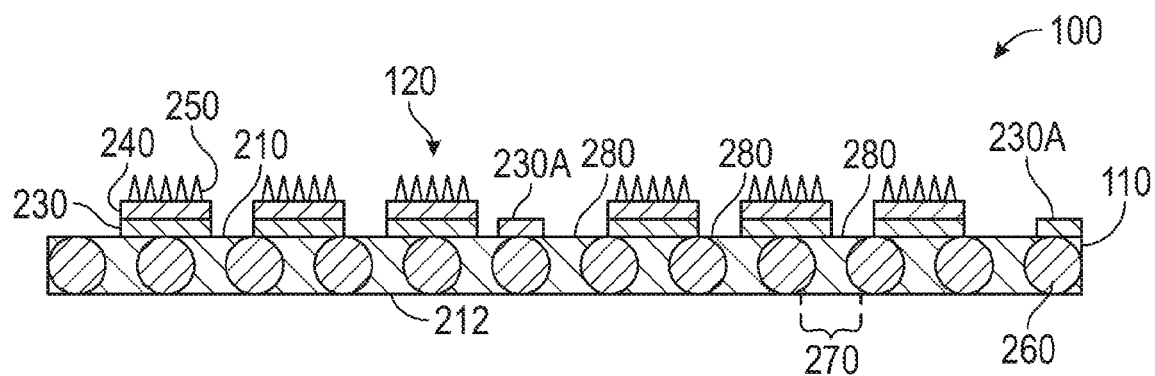
FIG. 2 is a side cross-sectional view of abrasive articles according to various embodiments of the present disclosure.

FIG. 2 shows a cross-section of an abrasive article referred to by the numeral 100 taken on the line 2-2 of FIG. 1 looking in the direction of the arrows. As shown in FIG. 2, the abrasive article 100 includes: a fabric substrate 110 comprising strands 260 forming first void spaces 270 between the strands 260; a laminate 230 joined to the fabric substrate 110; a cured resin composition 240 (e.g., the cured product of a phenolic resin) joined to the laminate 230 opposite the fabric substrate 110; abrasive particles 250 joined to the cured resin composition 240; and a plurality of second void spaces 280 extending through the laminate coinciding with first void spaces 270 in the fabric substrate 110. In some instances, the fabric substrate 110 comprises laminate 230A, which does not comprise cured resin composition 240 joined to laminate 230A.

The abrasive particles 250 are at least partially embedded in the cured resin composition 240. As used herein, the term "at least partially embedded" generally means that at least a portion of an abrasive particle is embedded in the cured resin composition, such that, the abrasive particle is anchored in the cured resin composition. In some embodiments, abrasive particles 250 are coated onto the laminate 230 together in the form of a slurry composition. Abrasive particles 250 can optionally be oriented by influence of a magnetic field prior to the resin 240A being cured. See, for example, commonly-owned PCT Pub. Nos. 2018/080703, 2018/080756, 2018/080704, 2018/080705, 2018/080765, 2018/080784, 2018/136271, 2018/134732, 2018/080755, 2018/080799, 2018/136269, 2018/136268. In some other embodiments, abrasive particles 250 can optionally be placed using tools for controlled orientation and placement of abrasive particles. See, for example, commonly-owned PCT Pub. Nos. 2012/112305, 2015/100020, 2015/100220, 2015/100018, 2016/028683, 2016/089675, 2018/063962, 2018/063960, 2018/063958, 2019/102312, 2019/102328, 2019/102329, 2019/102330, 2019/102331, 2019/102332, 2016/205133, 2016/205267, 2017/007714, 2017/007703, 2018/118690, 2018/118699, 2018/118688, U.S. Pat. Pub. No. 2019-0275641, and U.S. Provisional Pat. Appl. Nos. 62/751,097, 62/767,853, 62/767,888, 62/780,987, 62/780,988, 62/780,994, 62/780,998, 62/781,009, 62/781,021, 62/781,037, 62/781,043, 62/781,057, 62/781,072, 62/781,077, 62/781,082, 62/825,938, 62/781,103.

Figure 10:
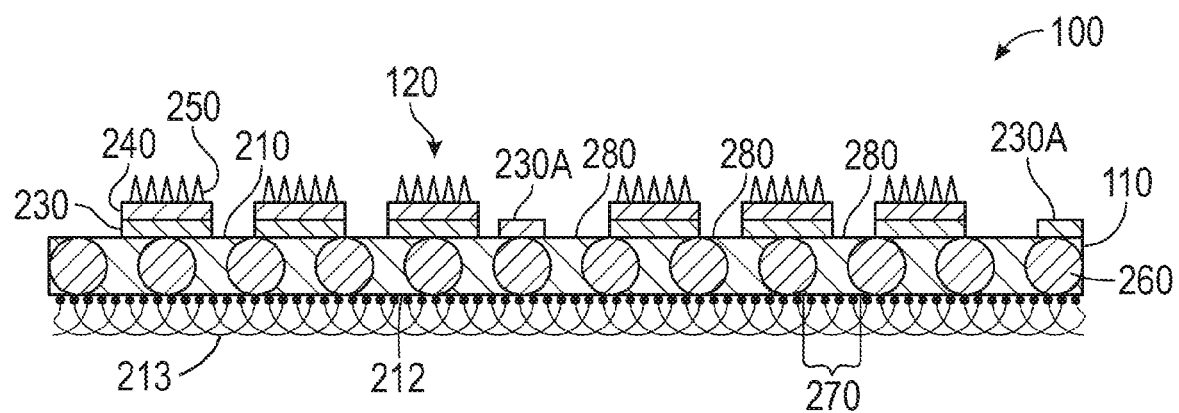
FIG. 10 is a side cross-sectional view of an abrasive article according to embodiments of the present disclosure.

Making reference to FIGS. 2 and 10, the abrasive article 100 comprises a first side 210 joined to the laminate 230; and a second side 212 opposite the first side 210. The second side 212 can include one part of a two-part hook and loop attachment system 213. For example, FIG. 10 depicts the part of a two-part hook and loop attachment system as a loop layer 213.

Figure 3:
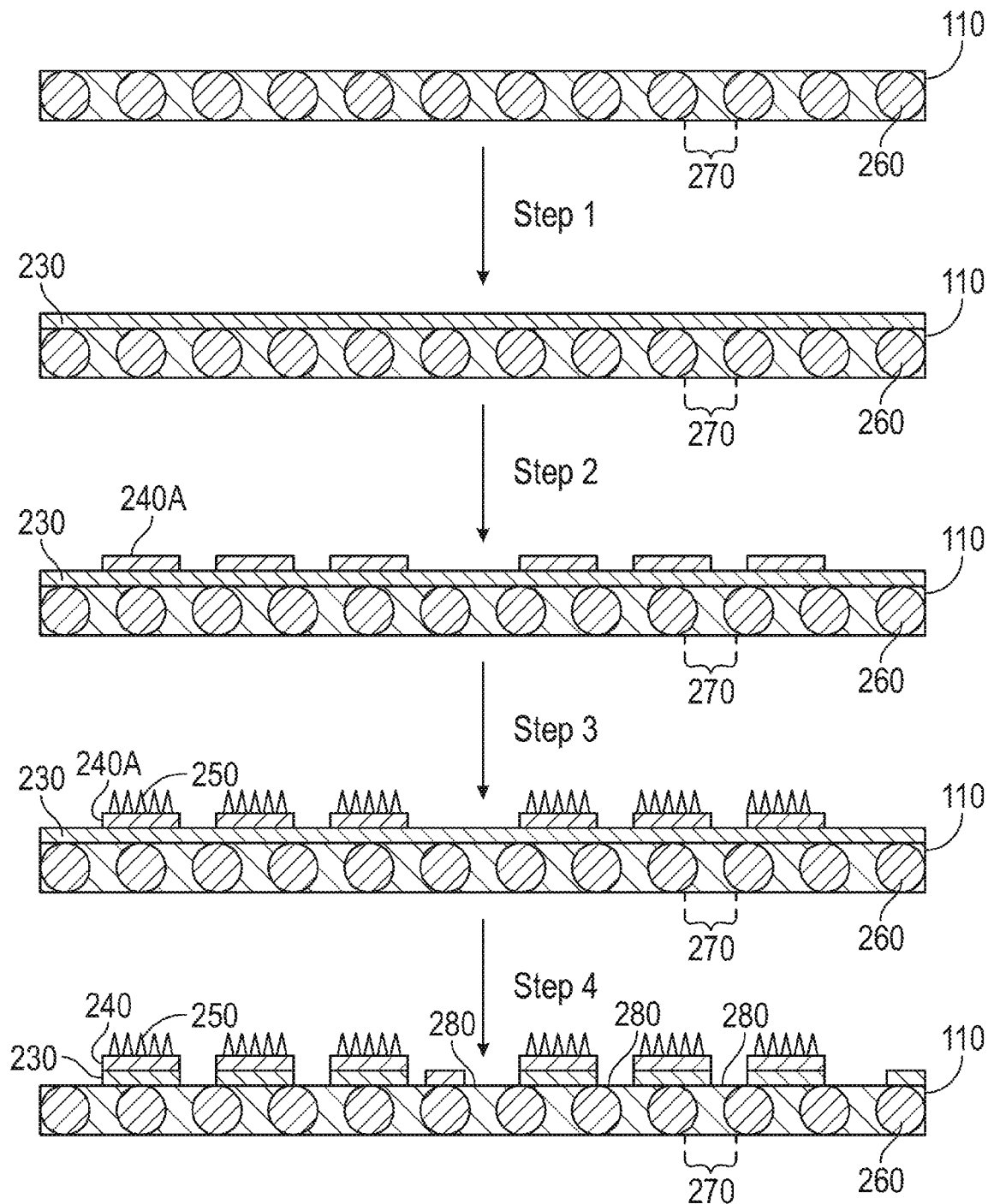
FIG. 3 is a schematic showing the step-wise construction of abrasive articles according to various embodiments of the present disclosure.

FIG. 3 shows an example of one method by which the abrasive article 100 shown in FIG. 1 can be constructed in step-wise fashion.

In a first step, laminate 230 is joined to fabric substrate 110 comprising strands 260 forming first void spaces 270 between the strands 260. The laminate 230 can be joined to the fabric substrate 110 by any suitable means, including by first applying a suitable adhesive layer (not shown) onto the substrate 110, followed by applying the laminate 230; by melting the laminate material onto the fabric substrate 110; printing the laminate 230 onto the fabric substrate 110; or combinations of any of the foregoing methods for joining the laminate 230 to the fabric substrate 110. The laminate 230 functions to, among other things, provide a substantially flat landing for uncured (or partially cured) resin composition 240A, such that uncured resin composition 240A that is deposited on the laminate 230 remains on the surface and does not have an opportunity to, e.g., move into the spaces 270 between strands 260 of fabric substrate 110.

In a second step, uncured resin composition 240A is joined to the laminate 230 opposite the fabric substrate 110. The uncured resin composition 240A can be joined to laminate 230 by any suitable means, including by using a (rotary) stencil/screen printing roll, flatbed screen/stencil printing or by directly printing the uncured resin composition 240A onto the laminate 230 or by using combinations of two or more suitable methods (e.g., extrusion die coating, curtain coating, knife coating, gravure coating, and spray coating) for joining the uncured resin composition 240A to the laminate 230 opposite the fabric substrate 110.

In a third step, abrasive particles 250 are joined to the uncured resin composition 240A by any suitable method, including drop, electrostatic, magnetic, and other mechanical methods of mineral coating. For example, abrasive particles 250 can be deposited onto uncured resin composition 240A by simply dropping the abrasive particles 250 onto the uncured resin composition 240A; by electrostatically depositing abrasive particles 250 onto the uncured resin composition 240A; or by using combinations of two or more suitable methods for joining the abrasive particles 250 to the uncured resin composition 240A. In some embodiments, the abrasive particles 250 can optionally be oriented under the influence of a magnetic field prior to the resin 240A being cured, as earlier indicated.

In a fourth step, the uncured resin composition 240A is cured, this way abrasive particles 250 are at least partially embedded in the cured resin composition 240 and are substantially permanently attached. Uncured resin composition 240A can be cured to form cured resin 240 by any applicable curing mechanism, including thermal cure, photochemical cure, moisture-cured or combinations of two or more curing mechanism. But if the uncured resin composition 240A is cured by any means that does not include heating, a fifth step (not shown) may be necessary to effect migration of laminate 230 away from the void spaces 270 between strands 260.

During the curing process, at least a portion of laminate 230 that is not covered by cured resin composition 240 migrates away from the first void spaces 270 between strands 260, thereby opening a plurality of second void spaces 280 extending through the laminate coinciding with first void spaces 270. The laminate 230 therefore avoids the first void spaces 270 when cured resin composition 240 is absent above the first void spaces 270. Moreover, the laminate 230 covers the first void spaces 270 when the cured resin composition 240 is above the first void spaces 270. The cured resin composition 240 supports the laminate 230 above the first void spaces 270.

Although FIG. 3 shows an example of one method by which the abrasive article 100 shown in FIG. 1 can be constructed in step-wise fashion, methods are also contemplated where one or more of the steps described herein can be accomplished in a single step or wherein certain steps can be performed in an order different than what is shown in FIG. 3. For example, uncured or partially cured resin composition 240A could be joined/deposited to laminate 230 first to form a first composite. The first composite material comprising uncured or partially cured resin 240A and laminate 230 could then be joined in a single step to fabric substrate 110, followed by Steps 3 and 4. Alternatively, laminate 230 and uncured or partially cured resin composition 240A could be co-deposited (e.g., co-extruded) onto fabric substrate 110, followed by Steps 3 and 4. In yet another alternative, abrasive particles 250 can be joined with uncured or partially cured resin composition 240A first, to form a second composite. In this instance, uncured or partially cured resin composition 240A could be joined/deposited on a removable liner first. The abrasive particles 250 could then be joined/deposited onto the uncured or partially cured resin composition 240A to form the second composite. The second composite material comprising abrasive particles 250 joined with uncured or partially cured resin composition 240A could then be joined/deposited to laminate 230 to make a third composite material. The third composite material comprising abrasive particles 250 joined with uncured or partially cured resin composition 240A, which is in turn joined to laminate 230, could then be joined in a single step to fabric substrate 110, followed by Steps 3 and 4.

Figure 4I:
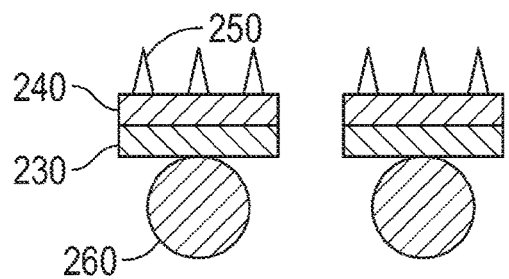
Figure 4I:
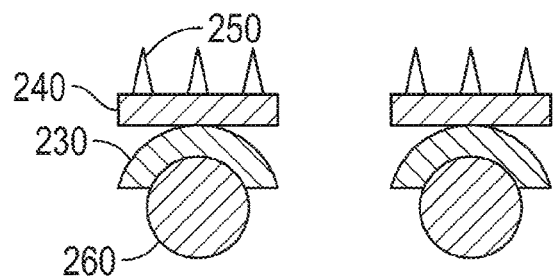
Figure 4I:
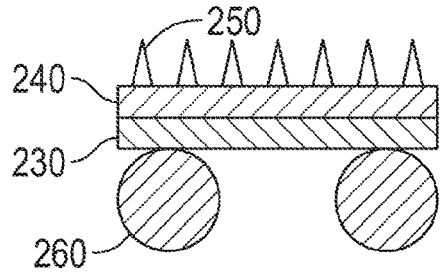
Figure 4I:
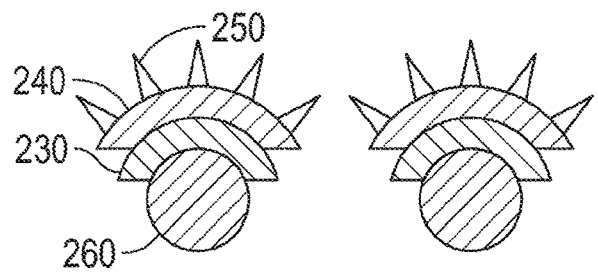
Figure 4I:
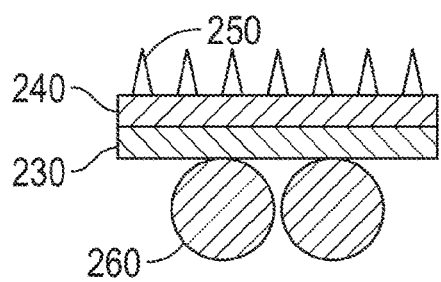
Figure 4I:
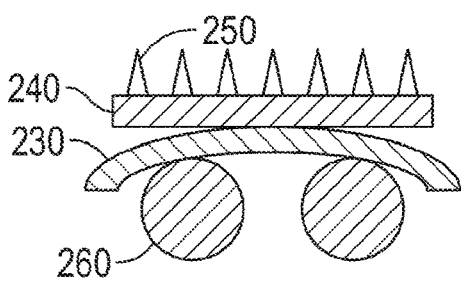
Figure 4I:
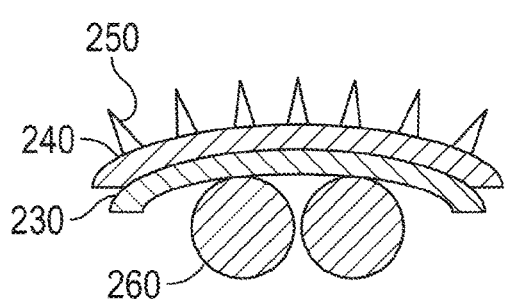
Figure 4I:
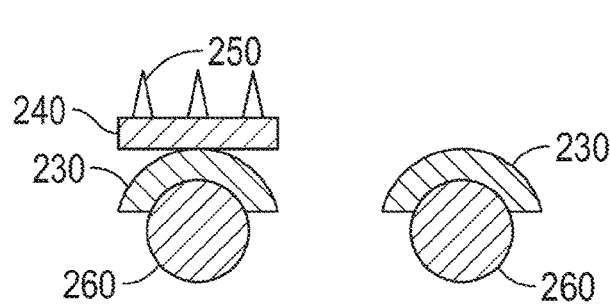
Figure 4I:
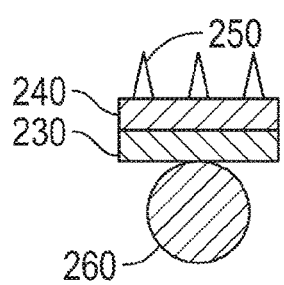

FIGS. 4A-4I show the various permutations (not exhaustive) that can occur when the laminate 230 that is not covered by cured resin composition 240 migrates away from the first void spaces 270 between strands 260. For example, the laminate 230 can at least partially wrap around the strands 260 to create second void spaces 280, thus leaving open the first void spaces 270 as shown in FIGS. 4B, 4D, 4F, 4G, 4H, and 4I. In such instances, the laminate 230 extends over only the strands 260, not over first void spaces 270. And in some instances, the laminate 230 can wrap around some stands 260 and not others, as shown in FIG. 4I.

Figure 5:
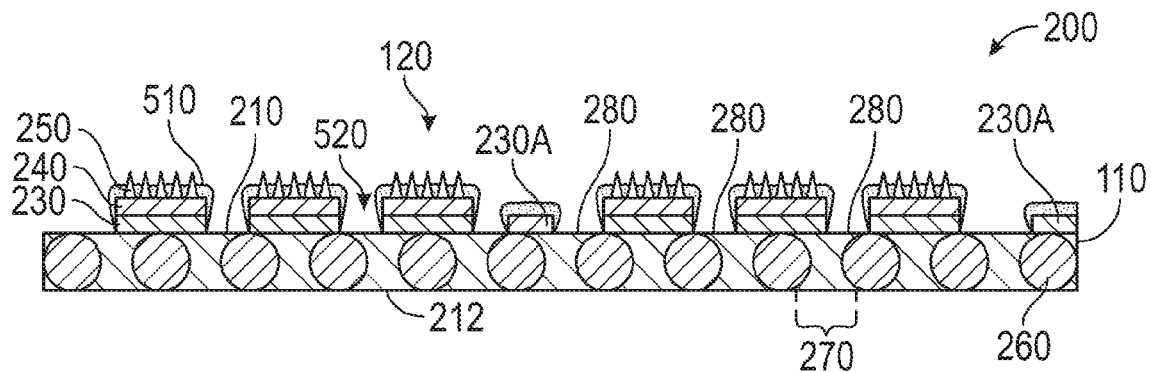
FIGS. 5-6 are side cross-sectional views of abrasive articles according to embodiments of the present disclosure.
Figure 6:
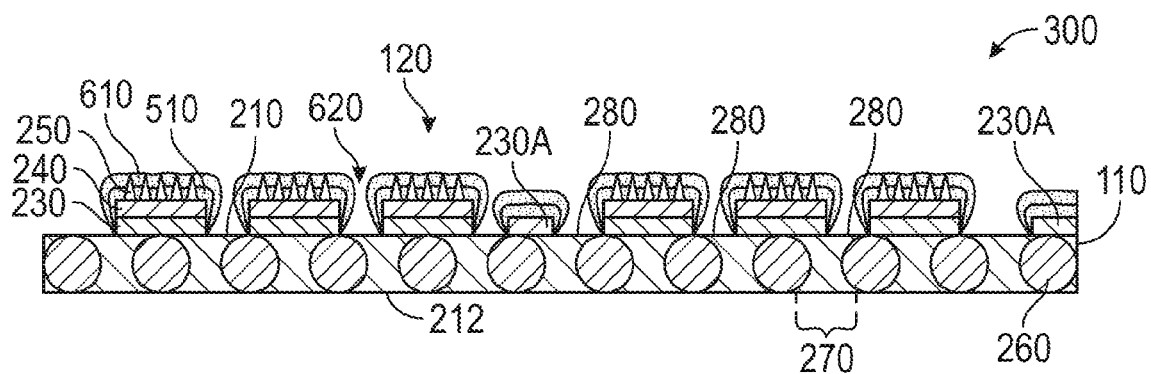

FIG. 5 shows one example of an abrasive article referred to by the numeral 200, which incorporates all of the features shown in FIG. 1, which will not be discussed again for the sake of brevity, but also a size coat 510 having size coat void spaces 520, which coincide with second void spaces 280. FIG. 6 shows one example of an abrasive article referred to by the numeral 300, which incorporates all of the features shown in FIG. 5, which will not be discussed again for the sake of brevity, but also a supersize coat 610 having supersize coat void spaces 620, which coincide with size coat void spaces 520 and second void spaces 280.

The layer configurations described herein are not intended to be exhaustive, and it is to be understood that layers can be added or removed with respect to any of the examples depicted in FIGS. 1-3.

The nature of the laminate 230 is also non-limiting. Generally speaking, laminate 230 can be any material (for example, a nonwoven or woven web or a film) that provides a substantially flat landing for uncured (or partially cured) resin composition 240A, such that uncured resin composition 240A that is deposited on the laminate 230 remains on the surface and does not have an opportunity to, e.g., move into the void spaces 270 between strands 260 of fabric substrate 110; but at the same time migrates away from the void spaces 270 between strands 260, e.g., during the curing process that forms cured resin composition 240, thereby opening a plurality of second void spaces 280 extending through the laminate coinciding with first void spaces 270. Suitable materials for laminate 230 include hot-meltable materials, including polyester hot-meltable materials (e.g., PE85 Polyester Hot Melt Web Adhesive available from Bostik, Wauwatosa, WI). The laminate 230 may be provided, for example, in the form of a continuous non-apertured sheet, or as a continuous apertured sheet whereby apertures are provided in areas adjacent to or surrounding pattern elements 121. In either case, the laminate provides a substantially flat landing for uncured (or partially cured) resin composition 240A.

The abrasive article of the various embodiments described herein include fabric substrate 110. Fabric substrate 110 may be constructed from any of a number of materials known in the art for making coated abrasive articles. Although not necessarily so limited, fabric substrate 110 can have a thickness of at least 0.02 millimeters, at least 0.03 millimeters, 0.05 millimeters, 0.07 millimeters, or 0.1 millimeters. The backing could have a thickness of up to 5 millimeters, up to 4 millimeters, up to 2.5 millimeters, up to 1.5 millimeters, or up to 0.4 millimeters.

Fabric substrate 110 can be flexible and has voids spaces (e.g., void spaces 270 between strands 260) such that it is porous. Flexible materials from which fabric substrate 110 can be made include cloth (e.g., cloth made from fibers or yarns comprising polyester, nylon, silk, cotton, and/or rayon, which may be woven, knit or stitch bonded) and scrim. The fabric substrate 110 can comprise a loop backing.

The abrasive layer of the abrasive article of the various embodiments described herein is made from a curable composition (e.g., uncured or partially cured resin composition 240A). In some instances, therefore, this specification makes reference to cured (e.g., cured resin composition 240) or uncured compositions (e.g., uncured or partially cured resin composition 240A), where the cured composition is synonymous with the abrasive layer 120.

The nature of the uncured or partially cured resin composition 240A that is converted to cured resin composition 240 is non-limiting. For example, the uncured or partially cured resin composition 240A can comprise any suitable materials that can be cured to form abrasive layer 120. Suitable materials for forming abrasive layer 120 include phenolic resins (e.g., PREFERE 80 5077A from Arclin, Mississauga, Ontario, Canada). Suitable phenolic resins are generally formed by condensation of phenol or an alkylated phenol (e.g., cresol) and formaldehyde, and are usually categorized as resole or novolac phenolic resins. Novolac phenolic resins are acid-catalyzed and have a molar ratio of formaldehyde to phenol of less than 1:1. Resole (also resol) phenolic resins can be catalyzed by alkaline catalysts, and the molar ratio of formaldehyde to phenol is greater than or equal to one, typically between 1.0 and 3.0, thus presenting pendant methylol groups. Alkaline catalysts suitable for catalyzing the reaction between aldehyde and phenolic components of resole phenolic resins include sodium hydroxide, barium hydroxide, potassium hydroxide, calcium hydroxide, organic amines, and sodium carbonate, all as solutions of the catalyst dissolved in water.

Resole phenolic resins are typically coated as a solution with water and/or organic solvent (e.g., alcohol). Typically, the solution includes about 70 percent to about 85 percent solids by weight, although other concentrations may be used. If the solids content is very low, then more energy is required to remove the water and/or solvent. If the solids content is very high, then the viscosity of the resulting phenolic resin is too high which typically leads to processing problems.

Phenolic resins are well-known and readily available from commercial sources. Examples of commercially available resole phenolic resins useful in practice of the present disclosure include those marketed by Durez Corporation under the trade designation VARCUM (e.g., 29217, 29306, 29318, 29338, 29353); those marketed by Ashland Chemical Co. of Bartow, Florida under the trade designation AEROFENE (e.g., AEROFENE 295); and those marketed by Kangnam Chemical Company Ltd. of Seoul, South Korea under the trade designation PHENOLITE (e.g., PHENOLITE TD-2207).

The uncured or partially cured resin composition 240A that is converted to cured resin composition 240 can comprise additional components, including polyurethane dispersions, such as aliphatic and/or aromatic polyurethane dispersions. For example, polyurethane dispersions can comprise a polycarbonate polyurethane, a polyester polyurethane, or polyether polyurethane. The polyurethane can comprise a homopolymer or a copolymer.

Examples of commercially available polyurethane dispersions include aqueous aliphatic polyurethane emulsions available as NEOREZ R-960, NEOREZ R-966, NEOREZ R-967, NEOREZ R-9036, and NEOREZ R-9699 from DSM Neo Resins, Inc., Wilmington, Massachusetts; aqueous anionic polyurethane dispersions available as ESSENTIAL CC4520, ESSENTIAL CC4560, ESSENTIAL R4100, and ESSENTIAL R4188 from Essential Industries, Inc., Merton, Wisconsin; polyester polyurethane dispersions available as SANCURE 843, SANCURE 898, and SANCURE 12929 from Lubrizol, Inc. of Cleveland, Ohio; an aqueous aliphatic self-crosslinking polyurethane dispersion available as TURBOSET 2025 from Lubrizol, Inc.; and an aqueous anionic, co-solvent free, aliphatic self-crosslinking polyurethane dispersion, available as BAYHYDROL PR240 from Bayer Material Science, LLC of Pittsburgh, Pennsylvania.

Additional suitable commercially available aqueous polyurethane dispersions include:
1) Alberdingk U 6150, a solvent-free, aliphatic polycarbonate polyurethane dispersion available from Alberdingk Boley GmbH, Krefeld, Germany, having a viscosity ranging from 50-500 mPa·s (according to ISO 1652, Brookfield RVT Spindle 1/rpm 20/factor 5), an elongation at break of about 200%, and a Koenig hardness after curing of about 65-70 s;
2) Alberdingk U 6800, an aqueous, solvent-free, colloidal, low viscosity dispersion of an aliphatic polycarbonate polyurethane without free isocyanate groups available from Alberdingk Boley GmbH, Krefeld, Germany, having a viscosity ranging from 20-200 mPa·s (according to ISO 2555, Brookfield RVT Spindle 1/rpm 50/factor 2), an elongation at break of about 500%, and a Koenig hardness after curing of about 45 seconds;
3) Alberdingk U 6100, an aqueous, colloidal, anionic, low viscosity dispersion of an aliphatic polyester-polyurethane without free isocyanate groups available from Alberdingk Boley GmbH, Krefeld, Germany, having a viscosity of 20-200 mPa·s (according to ISO 1652, Brookfield RVT Spindle 1/rpm 50 factor 2), an elongation at break of about 300%, and a Koenig hardness after curing of about 50 s;
4) Alberdingk U9800—a solvent-free aliphatic polyester polyurethane dispersion available from Alberdingk Boley GmbH, Krefeld, Germany having a viscosity of 20-200 mPa·s (according to ISO 1652, Brookfield RVT Spindle 1/rpm 20/factor 5), and elongation at break of about 20-50%, and a Koenig hardness after curing of about 100-130 s; and
5) Adiprene BL16—a liquid urethane elastomer with blocked isocyanate curing sites available from Chemtura, Middlebury, Connecticut.

Optional additives for polyurethane dispersions, as well as for curable compositions in general, include rheological modifiers, anti-foaming agents, water-based latexes and crosslinkers may be added to the aqueous polyurethane dispersion. Suitable crosslinkers include, for example, polyfunctional aziridine, methoxymethylolated melamine, urea resin, carbodiimide, polyisocyanate and blocked isocyanate. Additional water may also be added to dilute the formulation of the aqueous polyurethane dispersion, the phenolic resin, or combinations thereof. Curable compositions can be made, for example, from an aqueous polyurethane dispersion and a water-based latex.

The aqueous polyurethane dispersion contains less than about 20%, 10%, 5% or 2% organic solvent. In a specific embodiment, the aqueous polyurethane dispersion is substantially free of organic solvent. In some embodiments, it has been found that the aqueous polyurethane dispersion comprises at least about 7%, 15%, or 20% solids, and no greater than about 50% or 60% solids. The aqueous polyurethane dispersion may comprise no greater than about 80%, 85%, or 93% water. In some embodiments, it has been found that the aqueous polyurethane dispersion forms a film having a Koenig hardness of at least about 30 and no greater than about 200 seconds when measured according to ASTM 4366-16. Further, in some embodiments, it has been found that the aqueous polyurethane dispersion may have a surface tension that is at least about 50% of the surface tension of water and no greater than about 300% of the surface tension of water. And in some embodiments, the aqueous polyurethane dispersion may have a viscosity of at least about 10 mPa s to no greater than about 600 mPa s, or at least about 70%, 80% or 90% of the viscosity of water and no greater than about 600%, 500% or 400% of the viscosity of water.

In addition, in some embodiments, the aqueous polyurethane dispersion may comprise at least about 100, 1000, or even at least about 10000 parts per million (ppm) of dimethylolpropionic acid. Optional additives including rheological modifiers, anti-foaming agents, and crosslinkers may be added to the aqueous polyurethane dispersion, for example. Suitable crosslinkers include, for example, polyfunctional aziridine, methoxymethylolated melamine, urea resin, carbodiimide, polyisocyanate and blocked isocyanate. Additional water may be added to reduce viscosity of the aqueous polyurethane dispersion. Likewise, addition of up to 10 percent by weight of organic solvent (e.g., propyl methyl ether or isopropanol) to the aqueous polyurethane dispersion may be used to reduce viscosity and/or improve the miscibility of ingredients.

The dispersed polyurethane can include at least one polycarbonate segment, although this is not a requirement.

The phenolic resin and aqueous polyurethane dispersion components are mixed in a solids weight ratio of 91 to 99 percent by weight phenolic resin to 9 to 1 percent by weight of polyurethane. In some embodiments, the phenolic resin and aqueous polyurethane dispersion components are mixed in a solids weight ratio of 56 to 91 percent by weight phenolic resin to 44 to 9 percent by weight of polyurethane. In some embodiments, the phenolic resin and aqueous polyurethane dispersion components are mixed in a solids weight ratio of 62 to 91 percent by weight phenolic resin to 38 to 9 percent by weight of polyurethane. In some embodiments, the phenolic resin and aqueous polyurethane dispersion components are mixed in a solids weight ratio of 69 to 91 percent by weight phenolic resin to 31 to 9 percent by weight of polyurethane. In some embodiments, the phenolic resin and aqueous polyurethane dispersion components are mixed in a solids weight ratio of 56 to 83 percent by weight phenolic resin to 44 to 17 percent by weight of polyurethane. In some embodiments, the phenolic resin and aqueous polyurethane dispersion components are mixed in a solids weight ratio of 56 to 76 percent by weight phenolic resin to 44 to 24 percent by weight of polyurethane. In some embodiments, the phenolic resin and aqueous polyurethane dispersion components are mixed in a solids weight ratio of 56 to 69 percent by weight phenolic resin to 44 to 31 percent by weight of polyurethane.

The curable compositions of the various embodiments described herein may further contain any of a number of additives. Such additives may be homogeneous or heterogeneous with one or more components in the composition. Heterogenous additives may be discrete (e.g., particulate) or continuous in nature.

Aforementioned additives can include, for example, surfactants (e.g., antifoaming agents such as ethoxylated nonionic surfactants such as DYNOL 604), pigments (e.g., carbon black pigment such as C-SERIES BLACK 7 LCD4115), fillers (e.g. silicon dioxide Cabosil M5), synthetic waxes (e.g., synthetic paraffin MP22), stabilizers, plasticizers, tackifiers, flow control agents, cure rate retarders, adhesion promoters (for example, silanes such as (3-glycidoxypropyl)trimethoxysilane (GPTMS), and titanates), adjuvants, impact modifiers, expandable microspheres, thermally conductive particles, electrically conductive particles, and the like, such as silica, glass, clay, talc, colorants, glass beads or bubbles, and antioxidants, so as to, e.g., reduce the weight and/or cost of the structural layer composition, adjust viscosity, and/or provide additional reinforcement or modify the thermal conductivity of compositions and articles used in the provided methods or so that a more rapid or uniform cure may be achieved.

In some embodiments, the curable compositions can contain one or more fiber reinforcement materials. The use of a fiber reinforcement material can provide an abrasive layer having improved cold flow properties, limited stretchability, and enhanced strength. Preferably, the one or more fiber reinforcement materials can have a certain degree of porosity that enables a photoinitiator, when present, to be dispersed throughout, to be activated by UV light, and properly cured without the need for heat.

The one or more fiber reinforcements may comprise one or more fiber-containing webs including, but not limited to, woven fabrics, nonwoven fabrics, knitted fabrics, and a unidirectional array of fibers. The one or more fiber reinforcements could comprise a nonwoven fabric, such as a scrim.

Materials for making the one or more fiber reinforcements may include any fiber-forming material capable of being formed into one of the above-described webs. Suitable fiber-forming materials include, but are not limited to, polymeric materials such as polyesters, polyolefins, and aramids; organic materials such as wood pulp and cotton; inorganic materials such as glass, carbon, and ceramic; coated fibers having a core component (e.g., any of the above fibers) and a coating thereon; and combinations thereof.

Further options and advantages of the fiber reinforcement materials are described in U.S. Patent Publication No. 2002/0182955 (Weglewski et al.).

While resin-based methods have been described thus far for attaching abrasive particles to a nonwoven abrasive article, it is also expressly contemplated that other methods may be possible. For example, FIGS. 11-15 illustrate another embodiment of the present invention in which a heat-activated adhesive is used to attach abrasive particles to a fiber backing.

Figure 11:
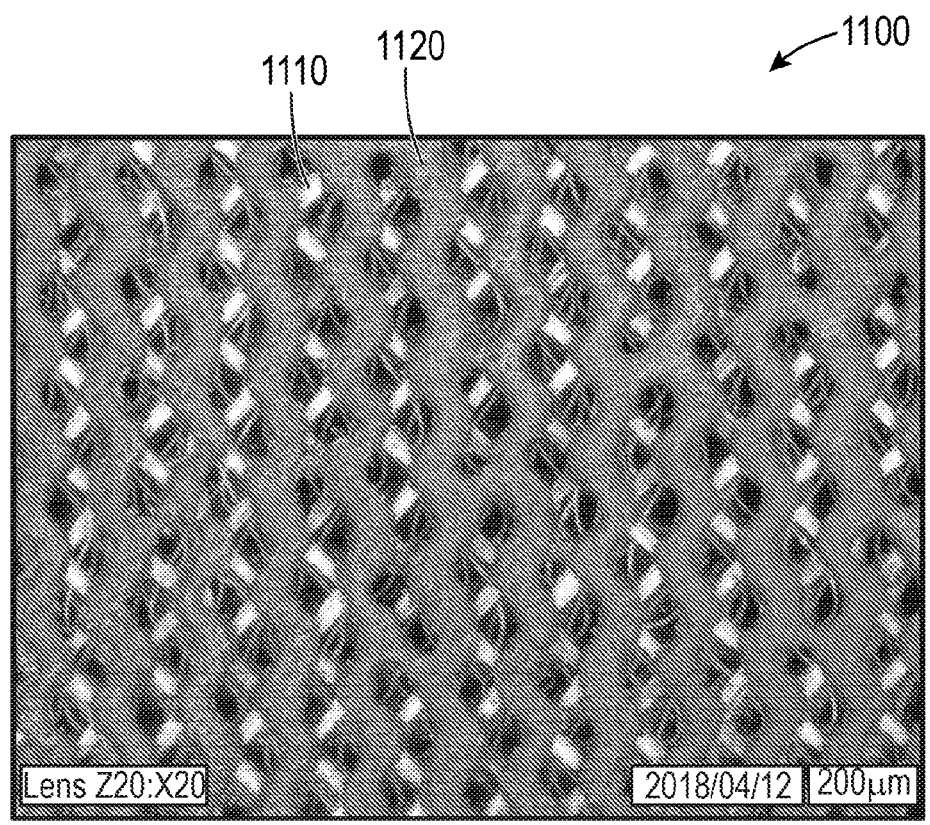
FIG. 11 is a close-up view of an abrasive article made with heat activated adhesive according to embodiments of the present disclosure.

FIG. 11 is a close-up view of an abrasive article made with heat activated adhesive according to embodiments of the present disclosure. FIG. 11 illustrates a mesh abrasive 1100 with a mesh backing 1110 onto which a heat activated adhesive 1120 has been applied. The heat activated adhesive can be applied on a nonwoven web and used to adhere abrasive particles without the use of an additional resin material. In one embodiment, an adhesive with a melting point above 170° is used. However, in other embodiments, adhesives with lower melting points can be used. The adhesive should have a melting point high enough that the adhesive will not melt during use of an abrasive article.

Figure 12:
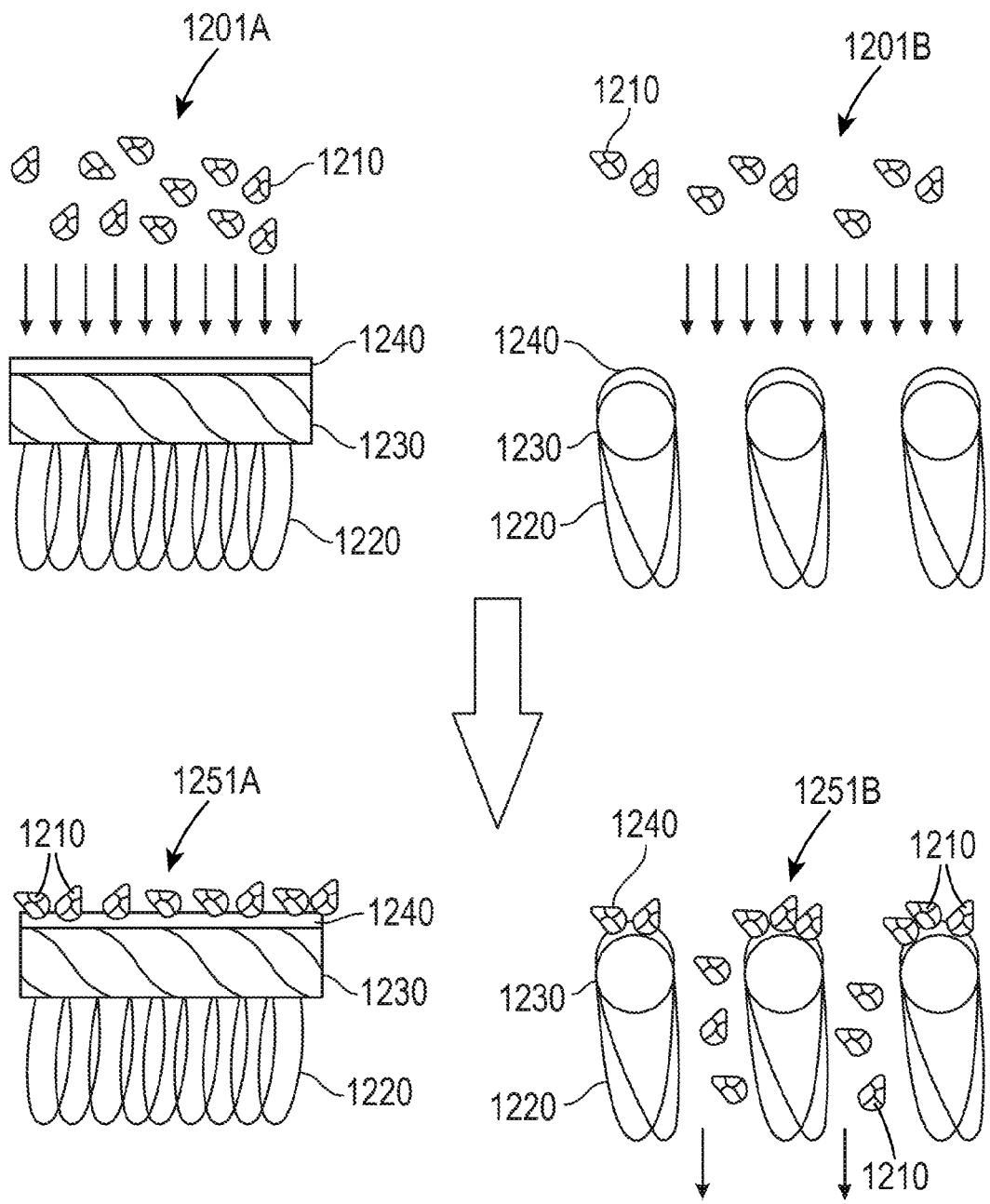
FIG. 12 is a schematic illustration of a method of making an abrasive article with heat activated adhesive according to embodiments of the present disclosure.

FIG. 12 is a schematic illustration of a method of making an abrasive article with heat activated adhesive according to embodiments of the present disclosure. Schematic images 1201A and 1251A illustrate a side view of backing showing the loops as attached to a single fiber. Schematic images 1201B and 1251B illustrate front views of three fibers in a mesh backing. While schematic images 1201A-B and 1251A-B illustrate only a few fibers 1230 for ease of understanding, it is understood that the concept applies to larger arrangements of fibers 1230.

A plurality of fibers 1230, each with one or more attached loops 1220, can be coated with a heat activated adhesive 1240. In one embodiment a heat activated adhesive film 1240 is laminated to fibers 1230. Adhesive film 1240 can be heated to a melting temperature, to ensure adhesion to fibers 1230, and cooled back down to room temperature. Abrasive particles 1210 can be applied to adhesive film 1240. For example, abrasive particles 1210 may be heated to a temperature high enough to soften adhesive film 1240, allowing abrasive particles 1210 to embed within adhesive layer 1240, as illustrated in schematic images 1251A and 1251B. Adhesive particles that do not attach to adhesive layer 1240 may fall through the voids in the fiber backing, as illustrated in FIG. 1251B.

While crushed abrasive particles are illustrated in FIG. 12, it is expressly contemplated that the method illustrated can be applied to other abrasive particles, such as platey, formed, shaped, or partially shaped particles.

Figure 13:
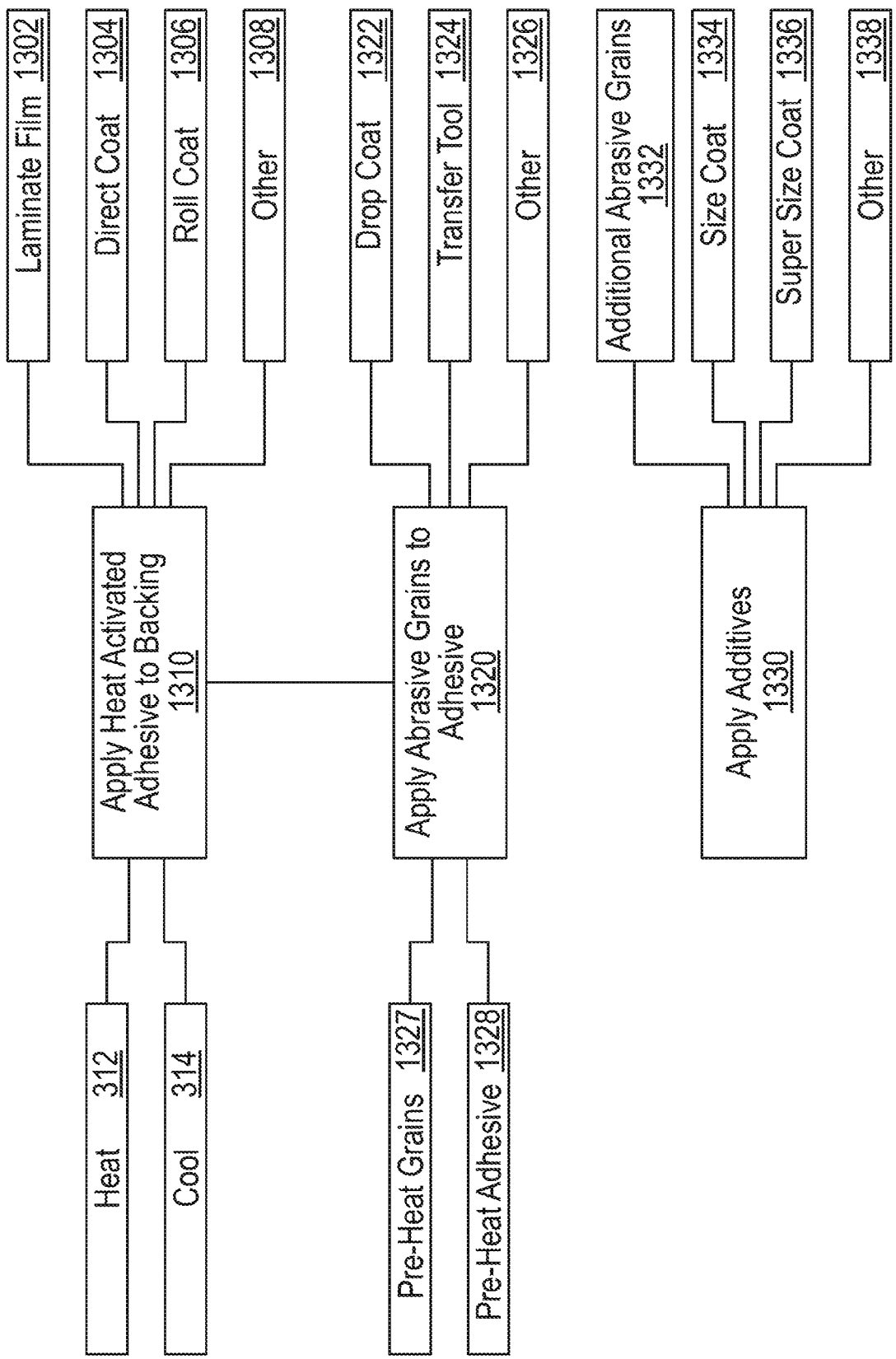
FIG. 13 is a method of making an abrasive article using heat activated adhesive according to embodiments of the present disclosure.

FIG. 13 is a method of making an abrasive article using heat activated adhesive according to embodiments of the present disclosure. Method 1300 may be useful for making abrasive articles.

In block 1310, a heat activated adhesive is applied to a backing. In one embodiment, the backing is a mesh backing. Applying a heat activated adhesive to a backing can include laminating the adhesive as a film, as indicated in block 1302, or directly coating the adhesive, as indicated in block 1304, or roll-coating the adhesive, as indicated in block 1306. Other application methods may also be used, as indicated in block 1308. Applying a heat-activated adhesive to a backing may also involve first heating the adhesive layer, as indicated in block 312, and then cooling the adhesive layer, as indicated in block 314.

In block 1320, abrasive grains are applied to the adhesive backing. Applying adhesive grains to the adhesive layer can include drop-coating methods, as indicated in block 1322, using a transfer tool, as indicated in block 1324, or other methods, as indicated in block 1326. For example, magnetically coated abrasive particles may be aligned on an adhesive-coated backing by applying a magnetic force. Additionally, abrasive particles may be coated using electrostatic forces.

The abrasive grains can be embedded into the adhesive layer by partially melting the heat-activated adhesive. This can be done by pre-heating the abrasive grains to a temperature higher than the melting point of the heat-activated adhesive, as indicated in block 1327. The potential cooling of the abrasive particles during transfer to the adhesive should be considered. Therefore, in some embodiments, the abrasive grains are heated to a temperature several degrees higher than the melting point to allow for cooling during the coating process. The adhesive-coated backing can be heated, either in addition to or as an alternative to heating the abrasive particles, as indicated in block 1328.

In block 1330, additives are applied. For example, multiple types of abrasive grains can be applied to the adhesive layer, as indicated in block 1332. For example, both precision shaped grains and crushed grains may be adhered to the adhesive layer. Alternatively, two different sizes of precision shaped grains may be applied to the adhesive layer. Additional functional layers may also be applied over the adhered abrasive grains, such as a size coat, as indicated in block 1334, or a supersize coat, as indicated in block 1336. Additional layers may also be included, as indicated in block 1338, such as a grinding aid or lubrication aid.

Figure 14A:
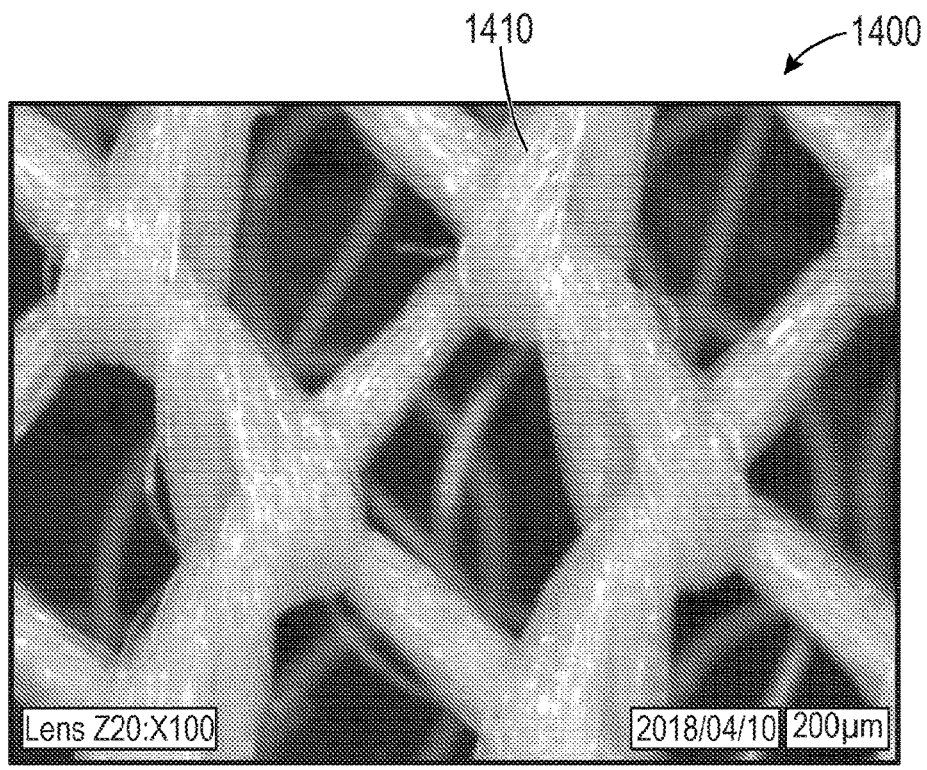
FIGS. 14A-14C illustrate steps in a method of making an abrasive article using heat activated adhesive according to embodiments of the present disclosure.
Figure 14B:
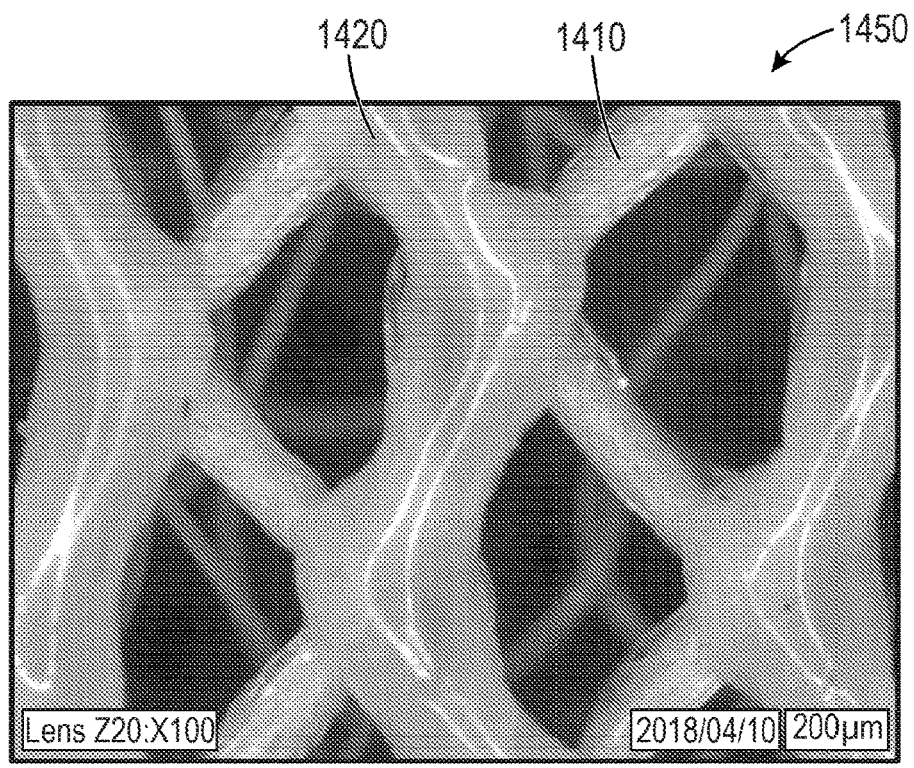
Figure 14C:
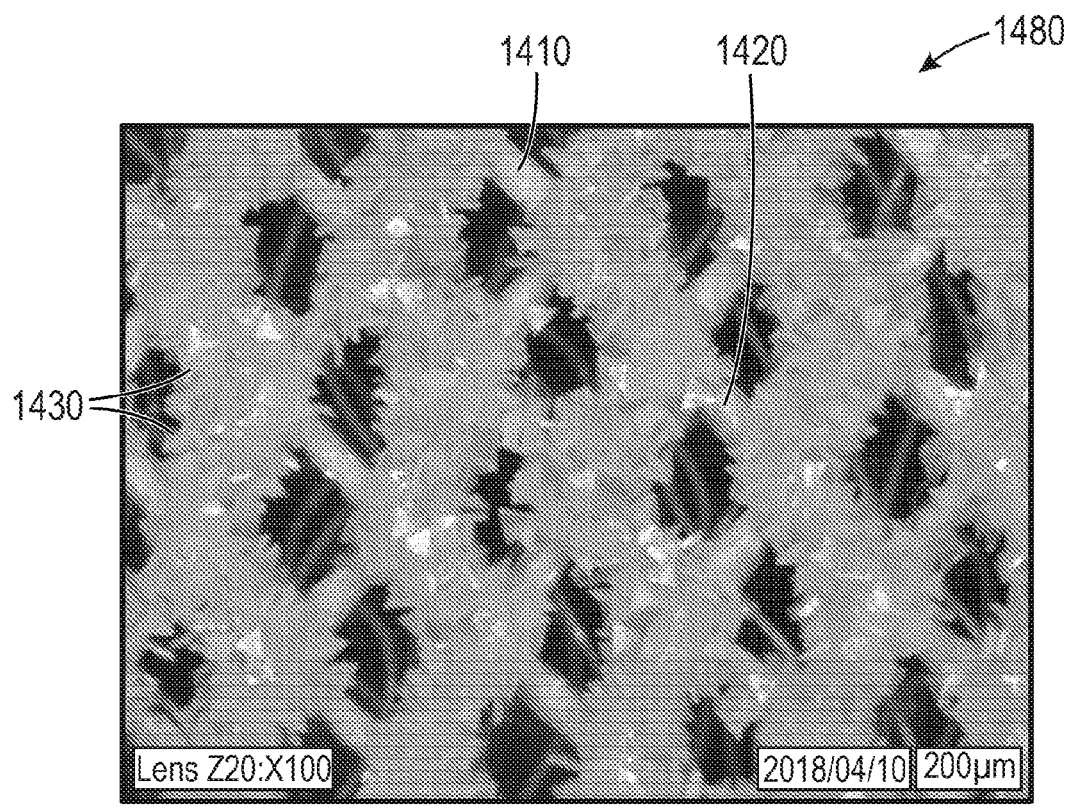

FIGS. 14A-14C illustrate steps in a method of making an abrasive article using heat activated adhesive according to embodiments of the present disclosure. FIG. 14A illustrates a mesh backing 1400 with a plurality of fibers 1410. FIG. 14B illustrates a mesh backing 1450 where a heat activated adhesive 1420 has been applied to portions of fibers 1410 of mesh backing 1450. FIG. 14C illustrates a mesh backing 1480 coated with precision-shaped abrasive particles 1430. The precision-shaped particles 1430 of FIG. 14C are triangle-shaped, however other shapes are also expressly envisioned for other embodiments.

Figure 15A:
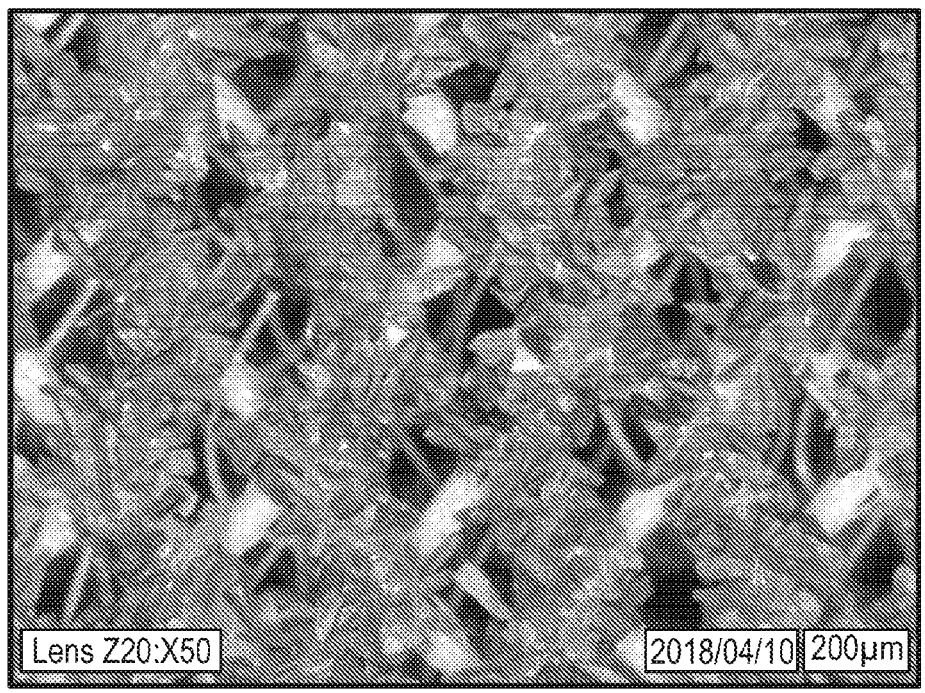
FIGS. 15A-15B illustrate close-up views of abrasive articles made with heat activated adhesive according to embodiments of the present disclosure.
Figure 15B:
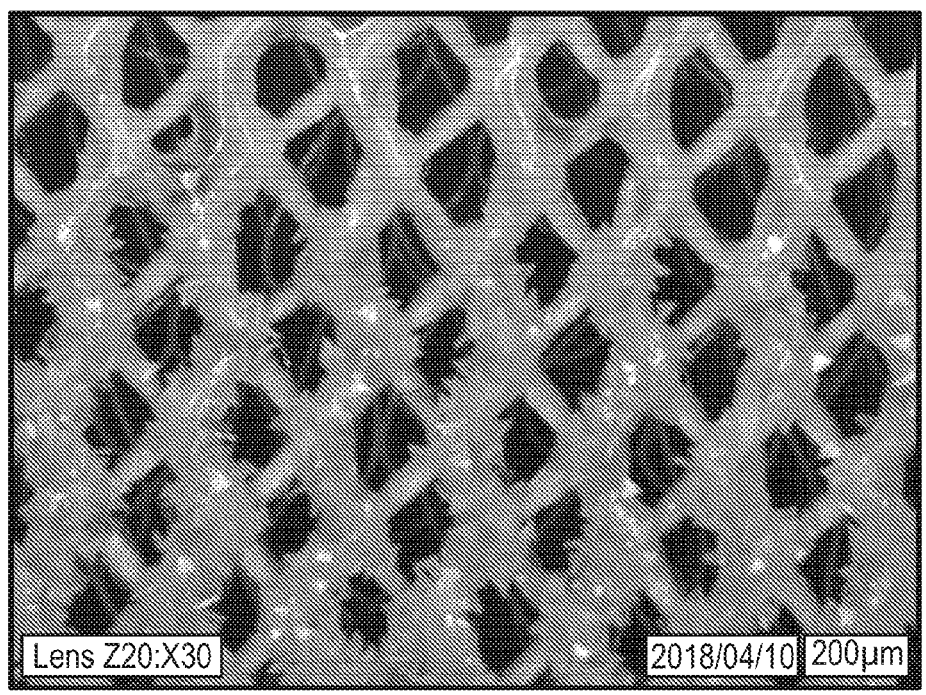

FIGS. 15A-15B illustrate close-up views of abrasive articles made with heat activated adhesive according to embodiments of the present disclosure. FIG. 15A illustrates a view of a mesh backing coated with P100 aluminum-zirconia abrasive particles. FIG. 15B illustrates a mesh backing coated with precision-shaped grain that was applied by heating the mesh backing to 155° C. before drop-coating the particles. However, it is also expressly contemplated that the particles, instead of or in addition to the mesh backing, could be pre-heated before application.

Figure 16:
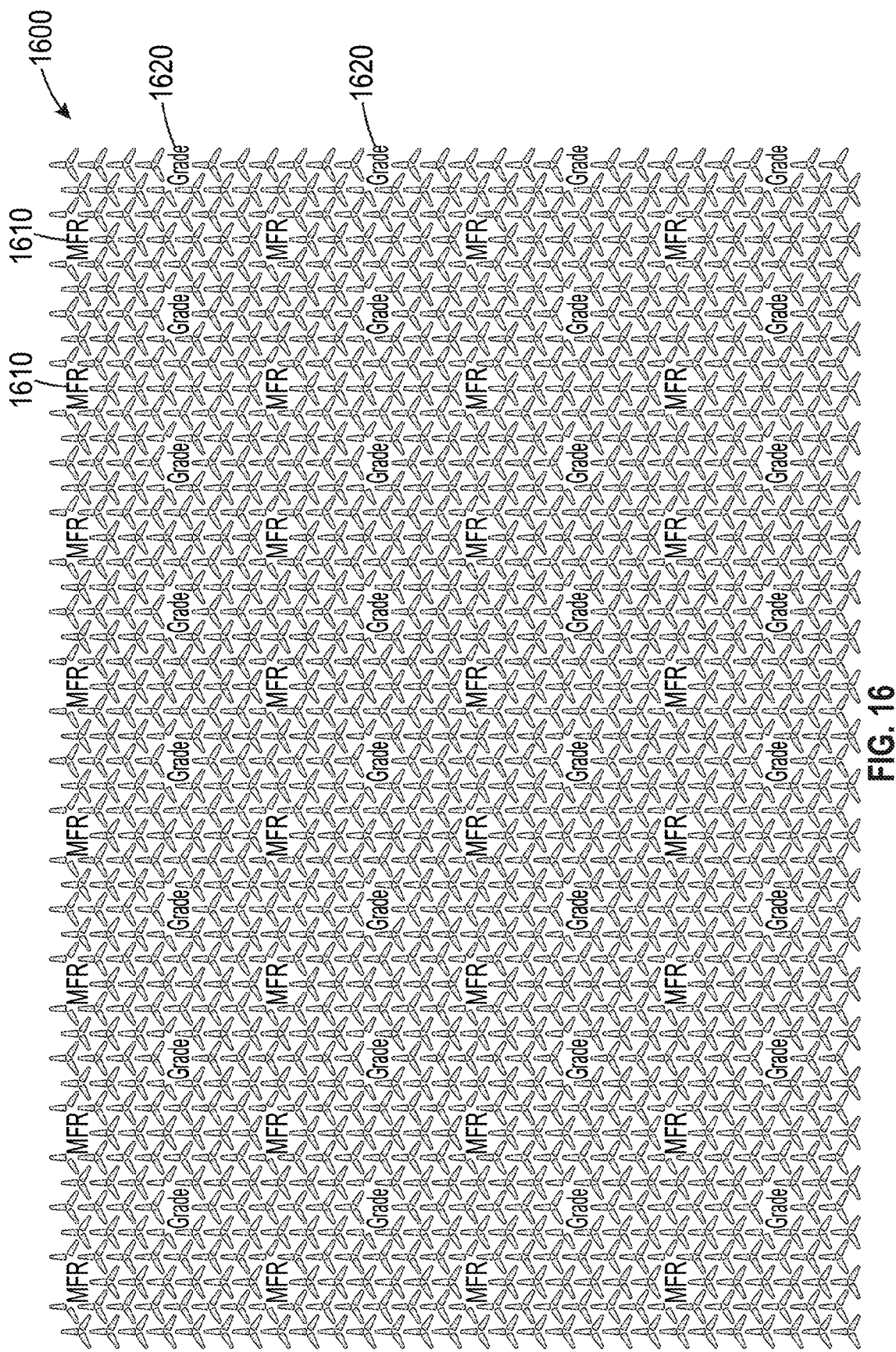
FIG. 16 illustrates an example design for an abrasive article according to embodiments of the present disclosure.

FIG. 16 illustrates an example design for an abrasive article according to embodiments of the present disclosure. The ability to adhere abrasive grains of a first color to a backing with a second color allows for a number of additional benefits. For example, as illustrated in FIG. 16, a pattern 1600 can allow for a manufacturer 1610 of an abrasive article may be identified. Additionally, a grade 1620 may be identified within pattern 1600. Additionally, other text or product information could also be provided.

A wide variety of abrasive particles may be utilized in the various embodiments described herein. The particular type of abrasive particle (e.g. size, shape, chemical composition) is not considered to be particularly significant to the abrasive article, so long as at least a portion of the abrasive particles are suitable for the intended end-use application. Suitable abrasive particles may be formed of, for example, cubic boron nitride, zirconia, alumina, silicon carbide and diamond.

The abrasive particles may be provided in a variety of sizes, shapes and profiles, including, for example, random or crushed shapes, regular (e.g. symmetric) profiles such as square, star-shaped or hexagonal profiles, and irregular (e.g. asymmetric) profiles.

The abrasive article may include a mixture of abrasive particles that are inclined on the backing (i.e. stand upright and extend outwardly from the backing) as well as abrasive particles that lie flat on their side (i.e. they do not stand upright and extend outwardly from the backing).

The abrasive article may include a mixture of different types of abrasive particles. For example, the abrasive article may include mixtures of platey and non-platey particles, crushed, agglomerated, and shaped particles (which may be discrete abrasive particles that do not contain a binder or agglomerate abrasive particles that contain a binder), conventional non-shaped and non-platey abrasive particles (e.g. filler material) and abrasive particles of different sizes.

Figure 17A:
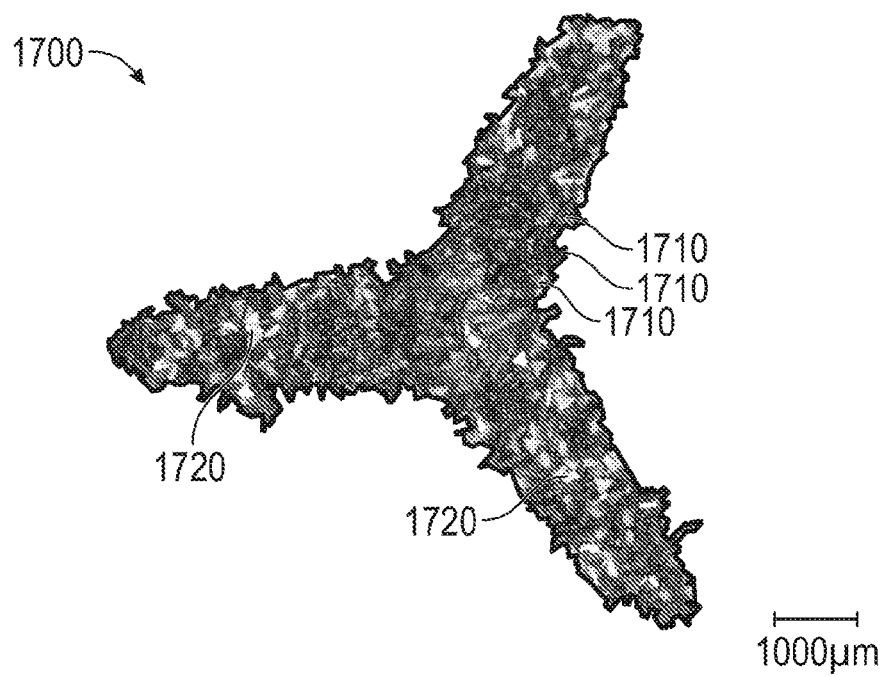
FIGS. 17-19 illustrate examples of another method of making an abrasive article with shaped agglomerate abrasive structures.
Figure 17B:
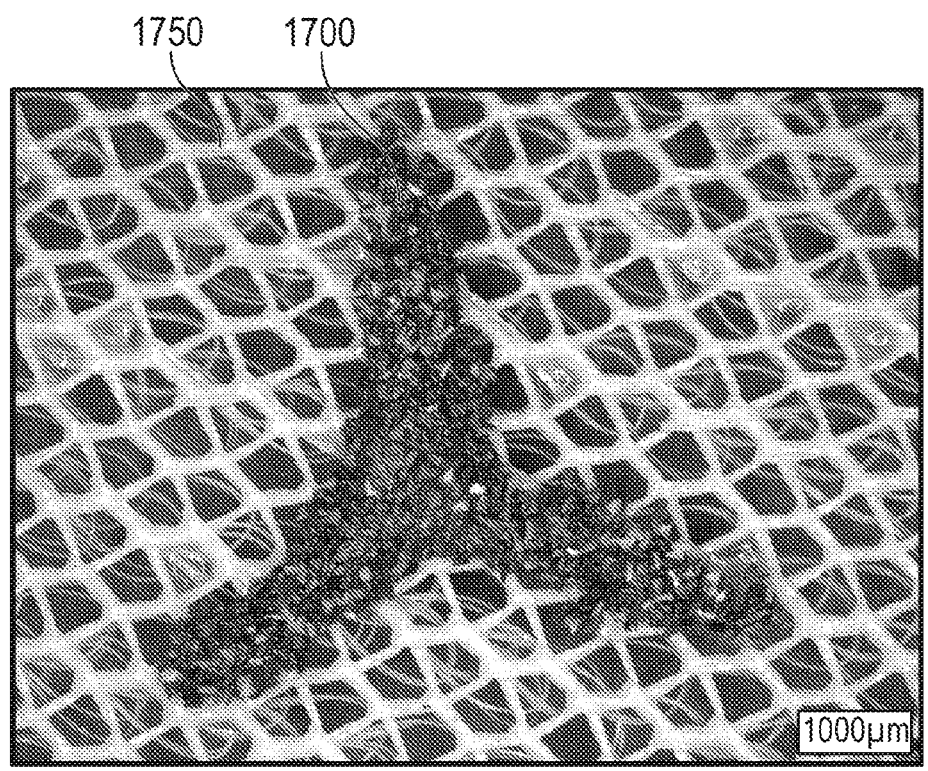
Figure 17C:
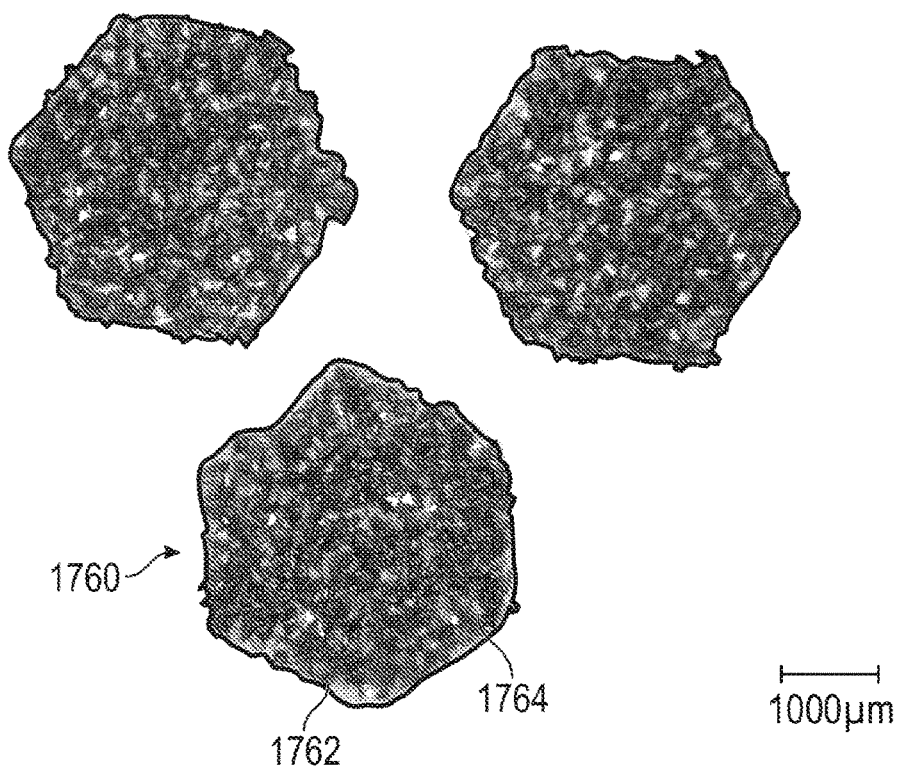
Figure 17D:
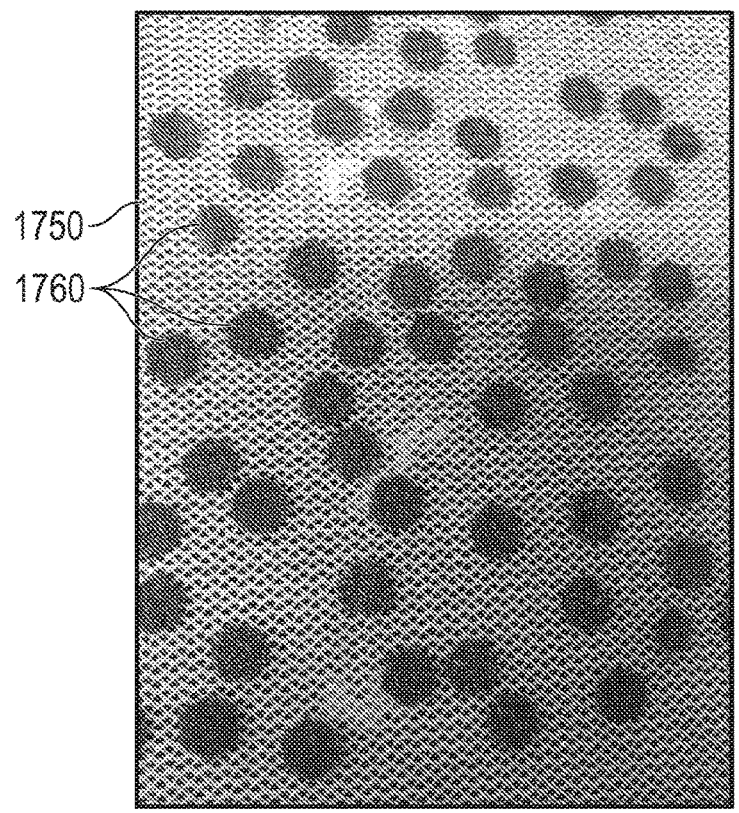
Figure 18:
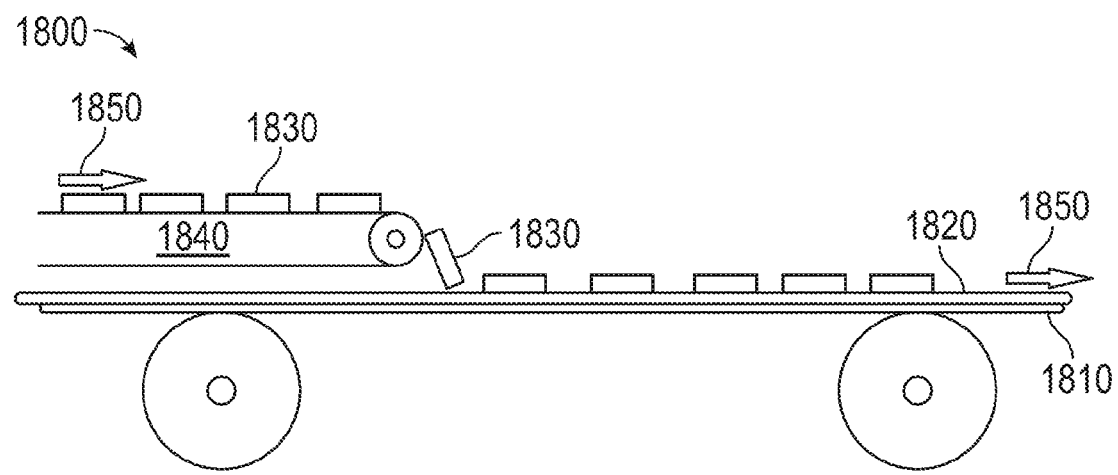

Examples of different types of agglomerate based abrasive articles on a mesh backing can be seen in FIGS. 17-19. FIGS. 17A-17D illustrate abrasive agglomerate particles on a mesh backing. As illustrated in FIG. 17A, an agglomerate abrasive particle 1700 includes abrasive grains 1710 and can have one or more agglomerate shape features. Agglomerate abrasive particle 1700, as illustrated in FIG. 17A, may also include a second type of abrasive particle 1720.

In one embodiment, abrasive agglomerate 1700 can be defined as having a width, w, a thickness, h, with a ratio of w/h being higher than 2. In a preferred embodiment, the width is higher than 5. In some embodiments, the width of the agglomerate is larger than 1000 μm. The abrasive agglomerates, as illustrated in FIGS. 17A-17D may be at least partially precisely shaped. The shapes may include, but are not limited to, nonagon, octagon, heptagon, hexagon, triangle (scalene, acute, obtuse, isosceles, equilateral, or right), parallelogram, rhombus, rectangle, square, pentagon, circle, oval, heart, cross, arrow, star (with any number of points from 3, as illustrated in FIG. 17A, to 10), or crescent.

Abrasive agglomerate particles such as those illustrated in FIGS. 17A-17D may be especially useful for making mesh abrasive articles. As illustrated in FIG. 17B, at least one dimension of the abrasive particle 1700 is greater than the gaps in mesh backing 1750, ensuring that abrasive agglomerates do not fall through the mesh backing.

As illustrated in FIGS. 17C and 17D, abrasive agglomerate particles 1760 may comprise abrasive particles 1764 within a resin bond 1762. The abrasive agglomerate particles may be placed on a backing 1750 in a pattern, or dropped in a random configuration. This can give the benefit of a 'patterned' abrasive structure, as each individual agglomerate has a shape, but also the benefits of random placement, which may reduce scratches or cut patterns on an abraded worksurface.

FIG. 18 illustrates one schematic method of making a mesh abrasive article with agglomerate abrasive particles. The agglomerates 1830 may be premade, for example, using methods of making agglomerates described in U.S. PAP 2019/0283216, published on Sep. 19, 2019 and U.S. PAP 2017/058254 (describing vitrified shaped agglomerates), and PCT Publication WO 2019/0167022, published Sep. 6, 2019 (describing siliceous bond agglomerates), as well as US PAP 2019/0270922, published Sep. 5, 2019, all of which are incorporated herein by reference. Once made, the agglomerates may proceed, as indicated in direction 1850, on a conveyance mechanism 1840. While a horizontal conveyance mechanism 1840 is illustrated, it is expressly contemplated that a tilted conveyance mechanism 1840, or other suitable deposition mechanisms, such as a drop coater or other suitable mechanism for depositing the agglomerates 1830 in a pattern or random configuration.

A backing 1810 proceeds, also in direction 1850 in one embodiment, on a conveyance mechanism. Backing 1810 may have a make coat 1820 applied such that deposited abrasive agglomerates 1830. Make coat 1820 may include a make resin, a blown melty film (such as those described in U.S. Pat. No. 4,118,531, issued on Jul. 13, 1977 and U.S. Pat. No. 4,215,682, issued on Feb. 6, 1978, incorporated by reference herein), or a hot melt adhesive, for example.

Figure 19A:
Figure 19B:
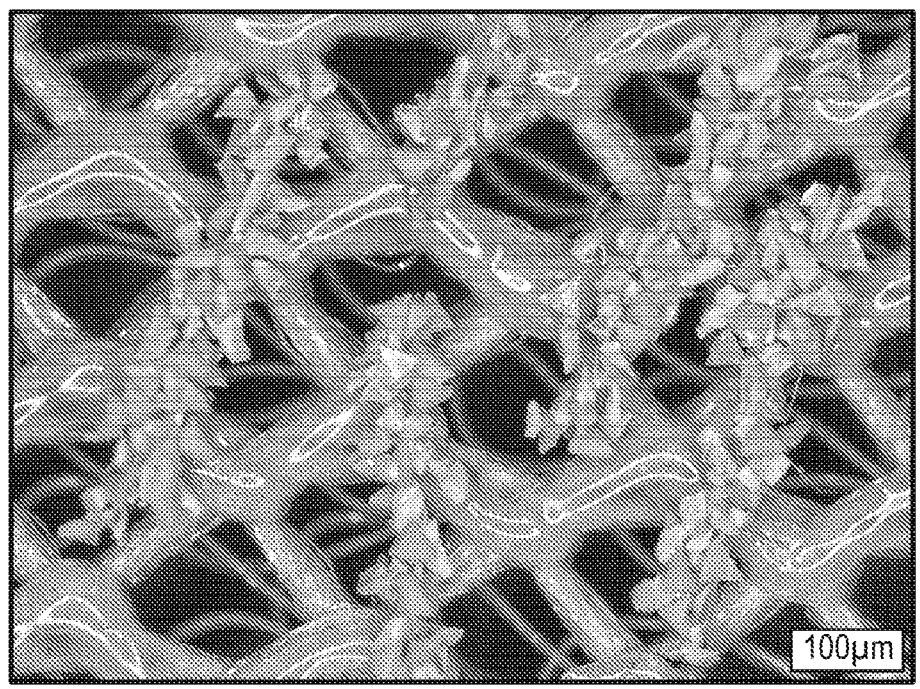
Figure 20:
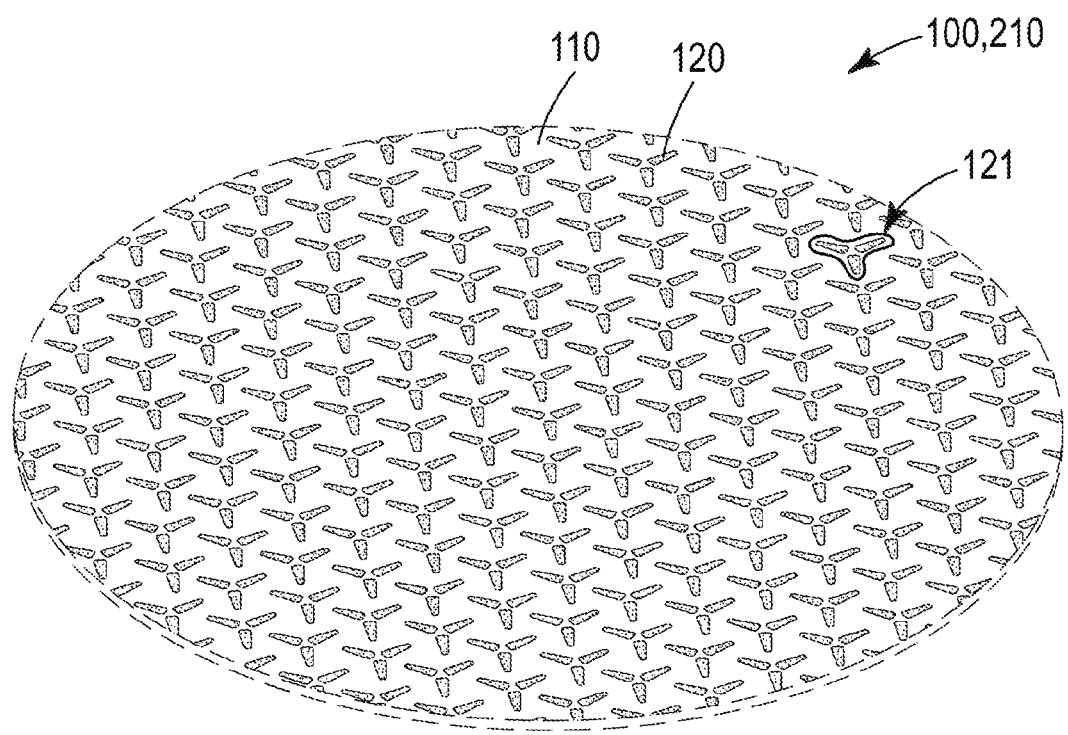
FIGS. 20, 24, and 26 are perspective views of abrasive articles having abrasive layers in various patterns according to embodiments of the present disclosure.
Figure 21:
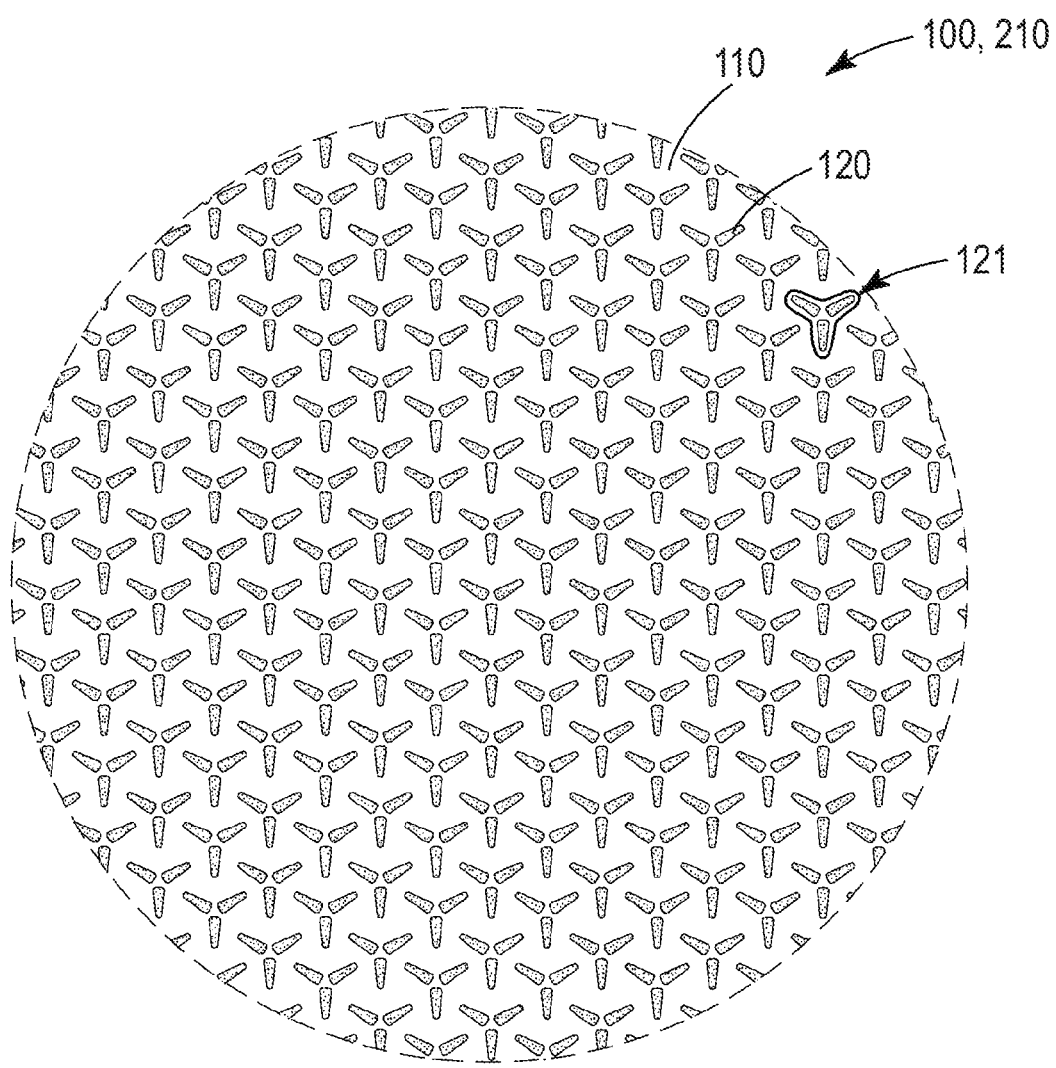
FIGS. 21, 25, and 27 are top views of the abrasive articles depicted in FIGS. 20, 24 and 26, respectively.
Figure 22:
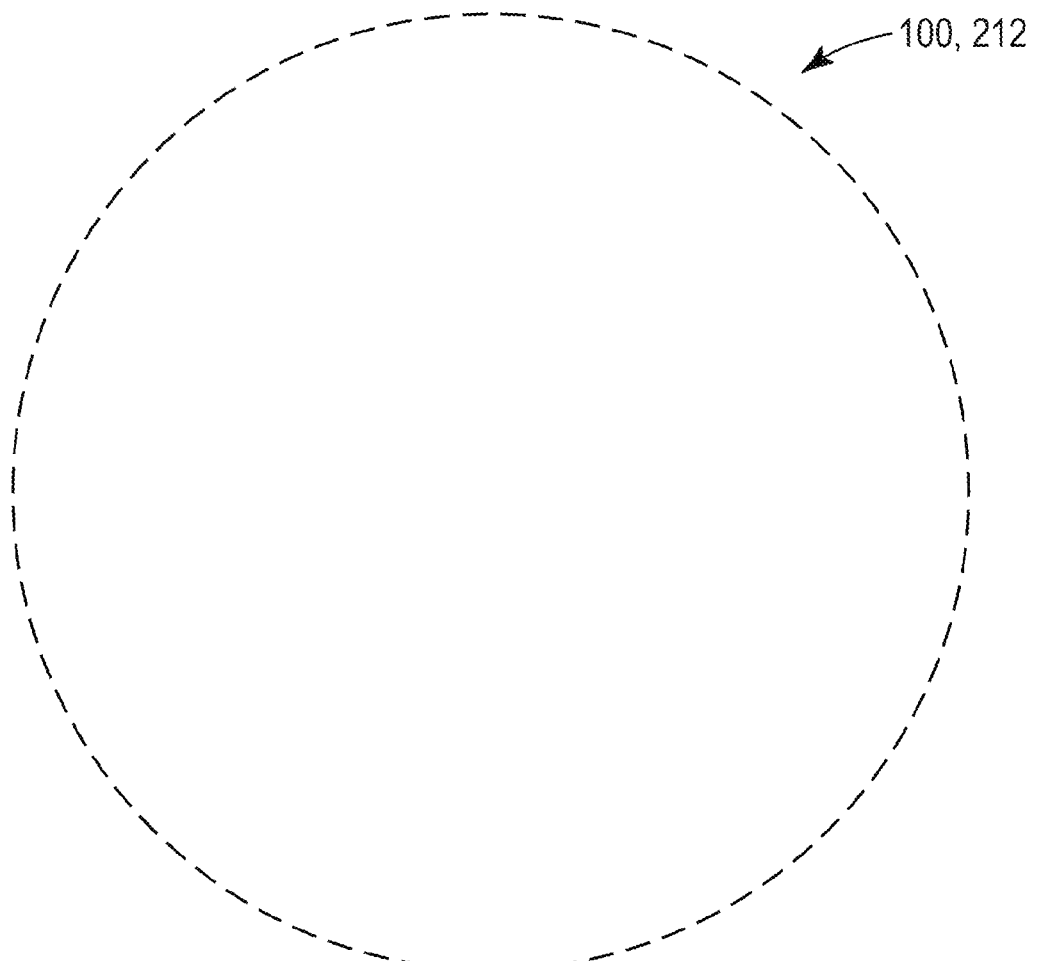
FIGS. 22 and 28 are bottom views of the abrasive articles depicted in FIGS. 20 and 26, respectively.
Figure 23:
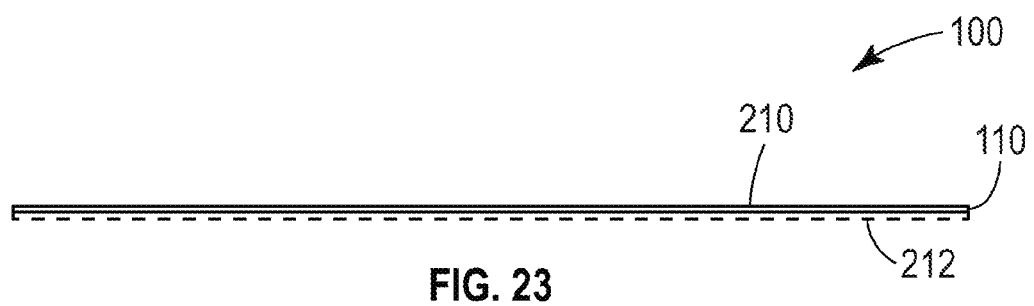
FIGS. 23 and 29 are side views of the abrasive articles depicted in FIGS. 20 and 26, respectively. It should be understood that the depicted side views can be considered to represent front and rear views, as these views are mirror images of one another.
Figure 24:
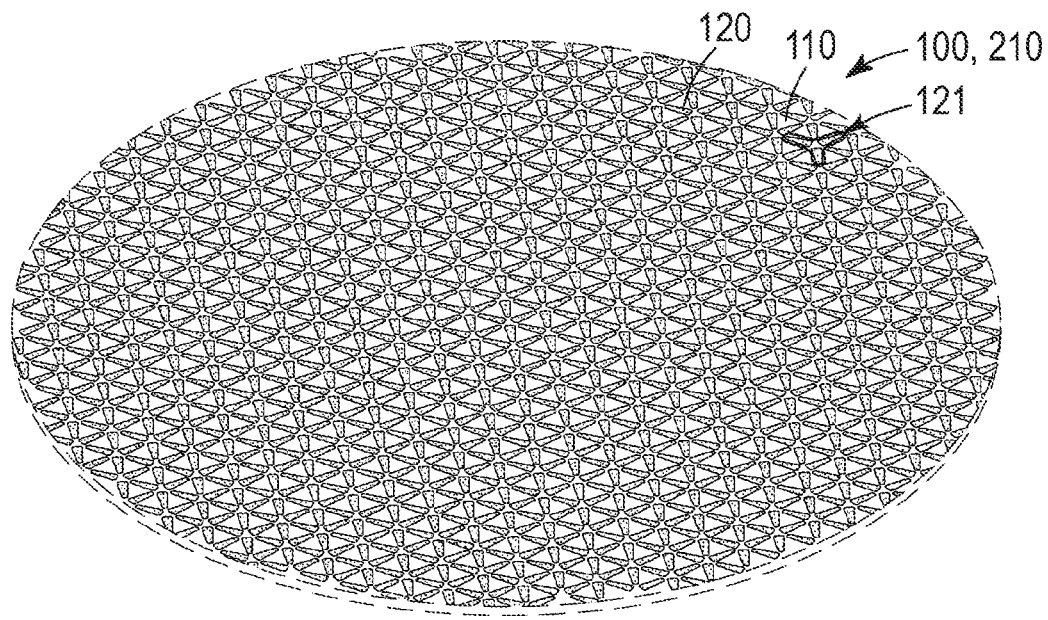
Figure 25:
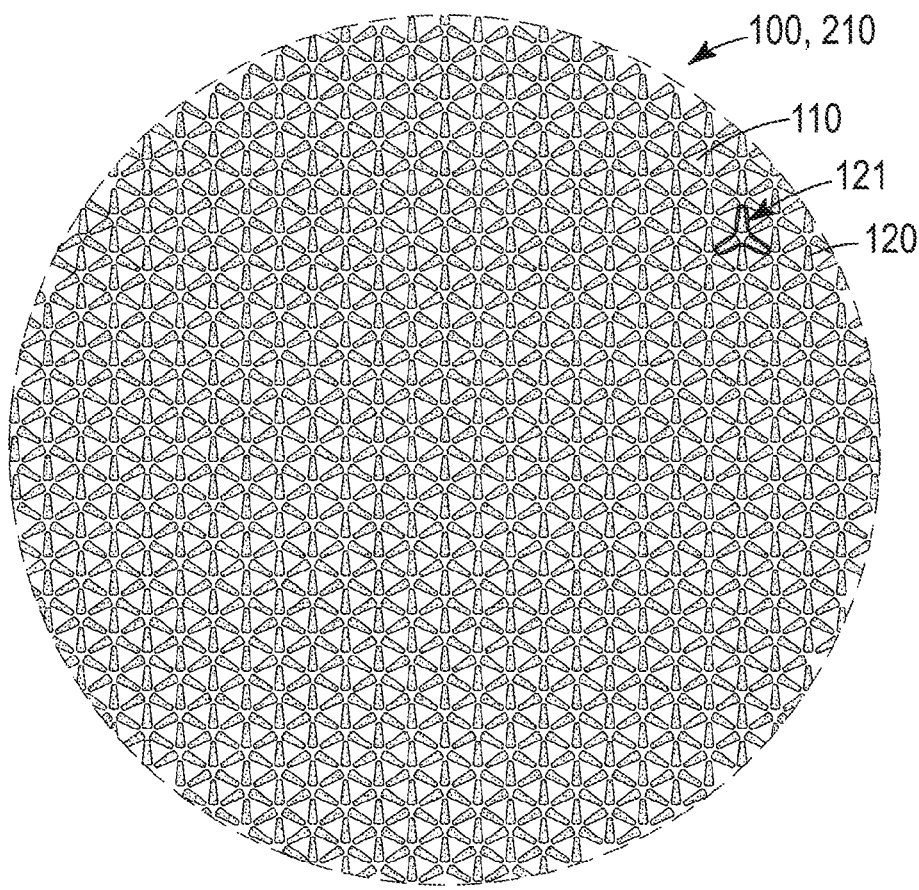
Figure 26:
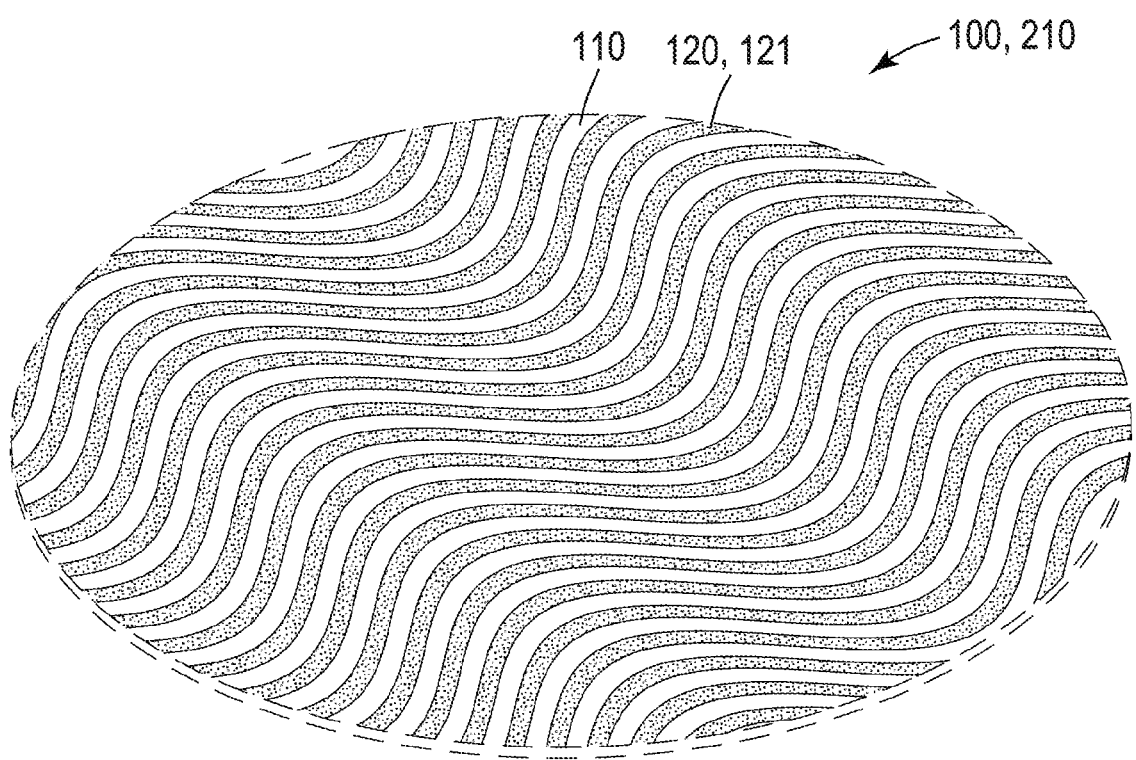
Figure 27:
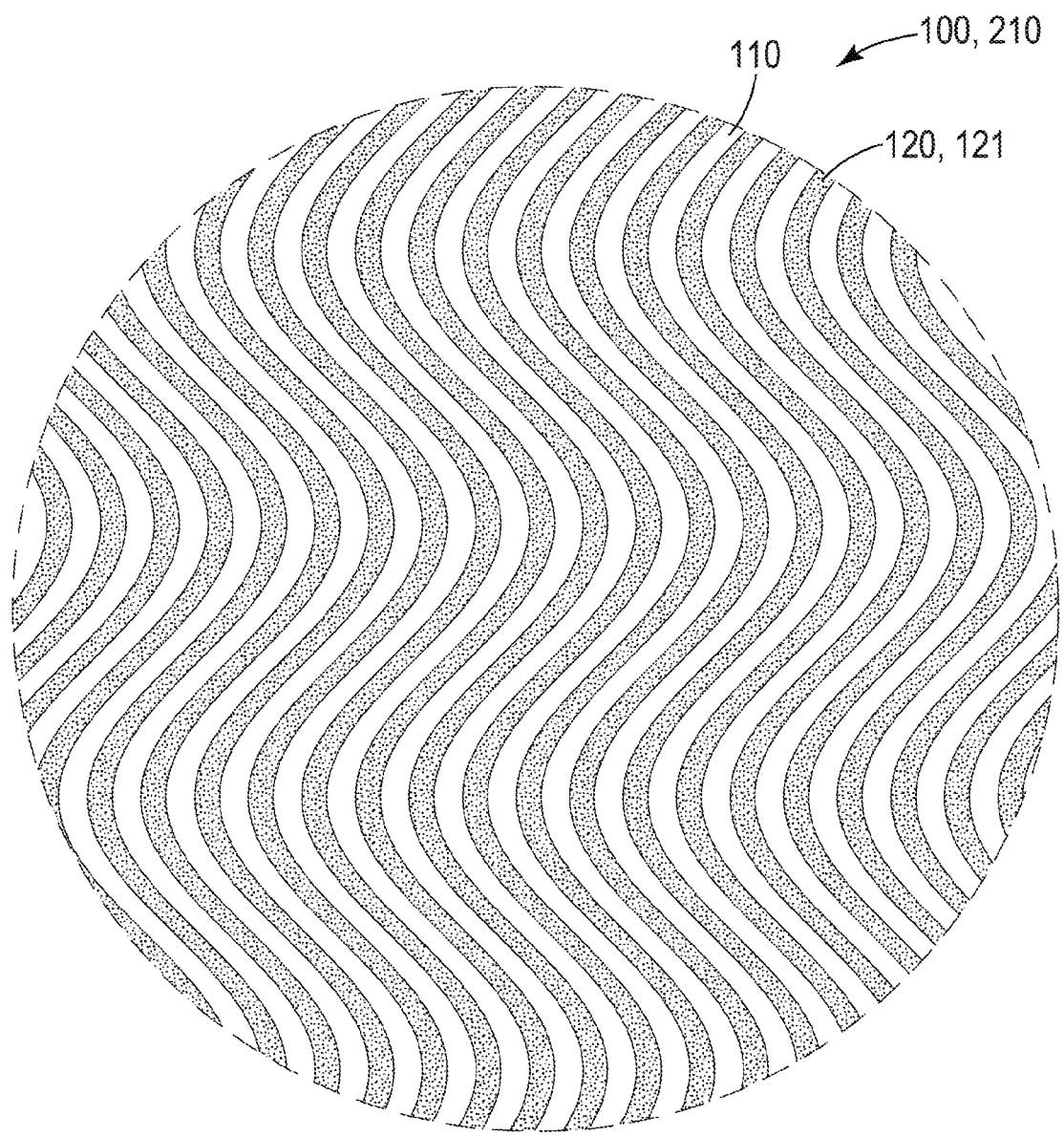
Figure 28:
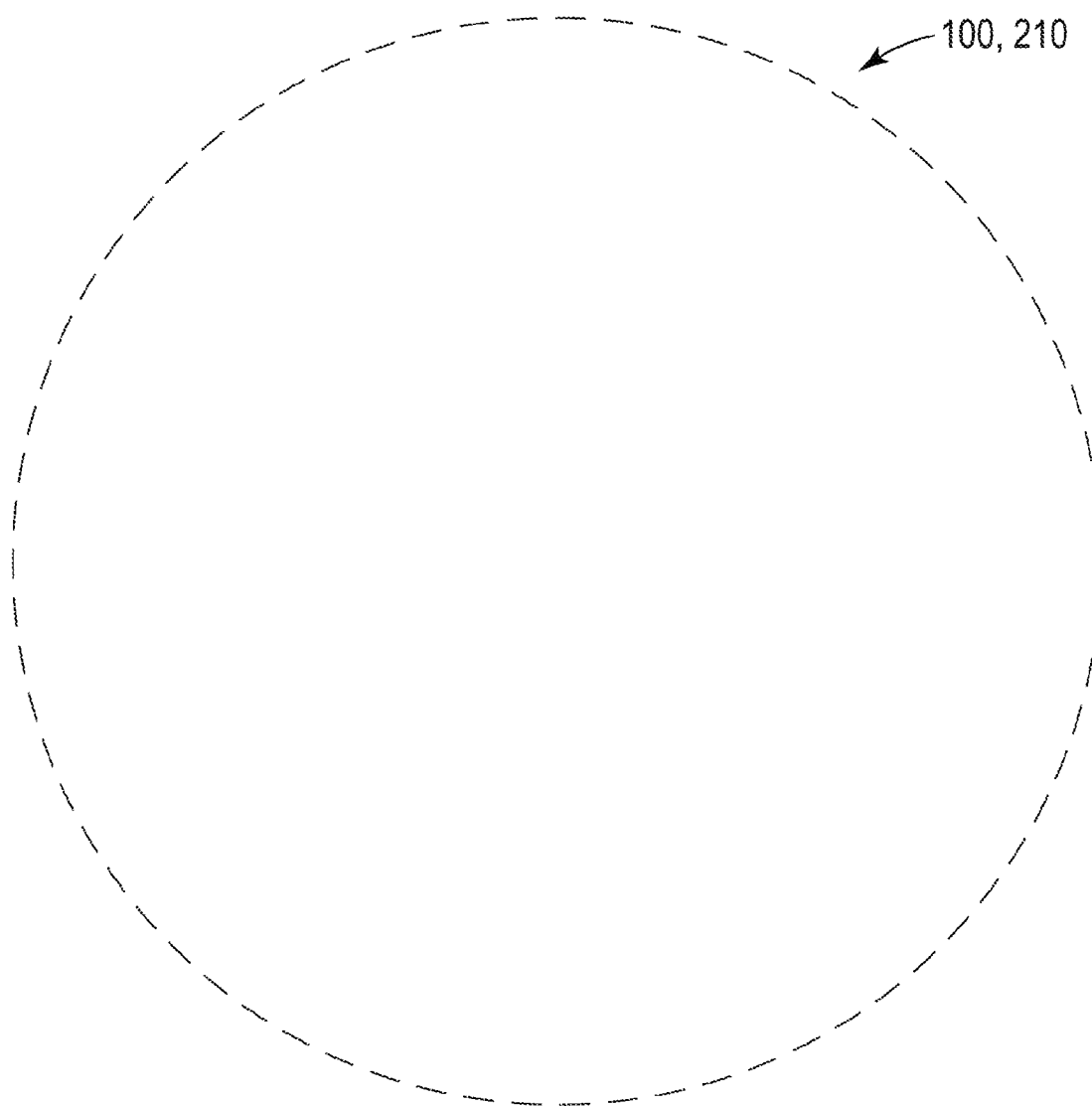
Figure 29:
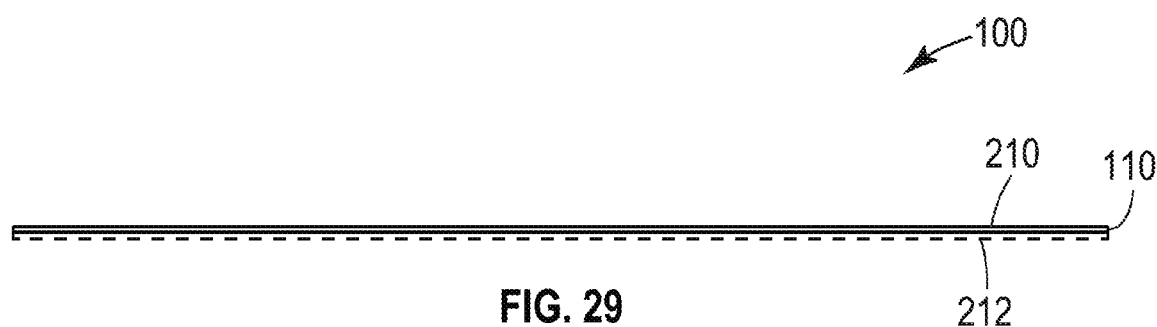

FIGS. 19A and 19B illustrate linear abrasive agglomerates that may also be useful in mesh abrasive article formation. As illustrated in FIG. 19B, the linear abrasive agglomerate has at least one dimension that is longer than a gap between mesh fibers, ensuring that the abrasive agglomerate will adhere to a make resin layer on the abrasive article.

Examples of suitable shaped abrasive particles can be found in, for example, U.S. Pat. No. 5,201,916 (Berg) and U.S. Pat. No. 8,142,531 (Adefris et al.) A material from which the shaped abrasive particles may be formed comprises alpha alumina. Alpha alumina shaped abrasive particles can be made from a dispersion of aluminum oxide monohydrate that is gelled, molded to shape, dried to retain the shape, calcined, and sintered according to techniques known in the art.

Examples of suitable shaped abrasive particles can also be found in Published U.S. Appl. No. 2015/0267097, which is incorporated herein by reference. Published U.S. Appl. No. 2015/0267097 generally describes abrasive particles comprising alpha alumina having an average crystal grain size of 0.8 to 8 microns and an apparent density that is at least 92 percent of the true density. Each shaped abrasive particle can have a respective surface comprising a plurality of smooth sides that form at least four vertexes.

U.S. Pat. No. 8,034,137 (Erickson et al.) describes alumina abrasive particles that have been formed in a specific shape, then crushed to form shards that retain a portion of their original shape features. In some embodiments, shaped alpha alumina particles are precisely-shaped (i.e., the particles have shapes that are at least partially determined by the shapes of cavities in a production tool used to make them). Details concerning such shaped abrasive particles and methods for their preparation can be found, for example, in U.S. Pat. No. 8,142,531 (Adefris et al.); U.S. Pat. No. 8,142,891 (Culler et al.); and U.S. Pat. No. 8,142,532 (Erickson et al.); and in U.S. Pat. Appl. Publ. Nos. 2012/0227333 (Adefris et al.); 2013/0040537 (Schwabel et al.); and 2013/0125477 (Adefris).

Examples of suitable crushed abrasive particles include crushed abrasive particles comprising fused aluminum oxide, heat-treated aluminum oxide, white fused aluminum oxide, ceramic aluminum oxide materials such as those commercially available as 3M CERAMIC ABRASIVE GRAIN from 3M Company, St. Paul, Minnesota, brown aluminum oxide, blue aluminum oxide, silicon carbide (including green silicon carbide), titanium diboride, boron carbide, tungsten carbide, titanium carbide, diamond, cubic boron nitride, garnet, fused alumina zirconia, iron oxide, chromia, zirconia, titania, tin oxide, quartz, feldspar, flint, emery, sol-gel-derived ceramic (e.g., alpha alumina), and combinations thereof. Further examples include crushed abrasive composites of abrasive particles (which may be platey or not) in a binder matrix, such as those described in U.S. Pat. No. 5,152,917 (Pieper et al.).

Examples of sol-gel-derived abrasive particles from which crushed abrasive particles can be isolated, and methods for their preparation can be found in U.S. Pat. No. 4,314,827 (Leitheiser et al.); U.S. Pat. No. 4,623,364 (Cottringer et al.); U.S. Pat. No. 4,744,802 (Schwabel), U.S. Pat. No. 4,770,671 (Monroe et al.); and U.S. Pat. No. 4,881,951 (Monroe et al.). It is also contemplated that the crushed abrasive particles could comprise abrasive agglomerates such as, for example, those described in U.S. Pat. No. 4,652,275 (Bloecher et al.) or U.S. Pat. No. 4,799,939 (Bloecher et al.).

The crushed abrasive particles comprise ceramic crushed abrasive particles such as, for example, sol-gel-derived polycrystalline alpha alumina particles. Ceramic crushed abrasive particles composed of crystallites of alpha alumina, magnesium alumina spinel, and a rare earth hexagonal aluminate may be prepared using sol-gel precursor alpha alumina particles according to methods described in, for example, U.S. Pat. No. 5,213,591 (Celikkaya et al.) and U.S. Publ. Pat. Appln. Nos. 2009/0165394 A1 (Culler et al.) and 2009/0169816 A1 (Erickson et al.).

Further details concerning methods of making sol-gel-derived abrasive particles can be found in, for example, U.S. Pat. No. 4,314,827 (Leitheiser); U.S. Pat. No. 5,152,917 (Pieper et al.); U.S. Pat. No. 5,435,816 (Spurgeon et al.); U.S. Pat. No. 5,672,097 (Hoopman et al.); U.S. Pat. No. 5,946,991 (Hoopman et al.); U.S. Pat. No. 5,975,987 (Hoopman et al.); and U.S. Pat. No. 6,129,540 (Hoopman et al.); and in U.S. Patent Publication No. 2009/0165394 A1 (Culler et al.). Examples of suitable platey crushed abrasive particles can be found in, for example, U.S. Pat. No. 4,848,041 (Kruschke).

The abrasive particles may be surface-treated with a coupling agent (e.g., an organosilane coupling agent) or other physical treatment (e.g., iron oxide or titanium oxide) to enhance adhesion of the crushed abrasive particles to the binder.

The abrasive layer, in some embodiments, includes a particulate mixture comprising a plurality of formed abrasive particles (e.g., precision shaped grain (PSG) mineral particles available from 3M, St. Paul, MN, which are described in greater detail herein; not shown in FIGS. 1-3) and a plurality of abrasive particles 250, or only formed abrasive particles, adhesively secured to the abrasive layer.

In some embodiment, the abrasive particles may be formed abrasive particles. As used herein, the term "formed abrasive particles" generally refers to abrasive particles (e.g., formed ceramic abrasive particles) having at least a partially replicated shape. Non-limiting examples of formed abrasive particles are disclosed in Published U.S. Patent Appl. No. 2013/0344786, which is incorporated by reference as if fully set forth herein. Non-limiting examples of formed abrasive particles include shaped abrasive particles formed in a mold, such as triangular plates as disclosed in U.S. Pat. Nos. RE 35,570; 5,201,916, and 5,984,998 all of which are incorporated by reference as if fully set forth herein; or extruded elongated ceramic rods/filaments often having a circular cross section produced by Saint-Gobain Abrasives an example of which is disclosed in U.S. Pat. No. 5,372,620, which is incorporated by reference as if fully set forth herein. Formed abrasive particle as used herein excludes randomly sized abrasive particles obtained by a mechanical crushing operation.

Formed abrasive particles also include shaped abrasive particles. As used herein, the term "shaped abrasive particle," generally refers to abrasive particles with at least a portion of the abrasive particles having a predetermined shape that is replicated from a mold cavity used to form the shaped precursor abrasive particle. Except in the case of abrasive shards (e.g. as described in U.S. patent publication US 2009/0169816), the shaped abrasive particle will generally have a predetermined geometric shape that substantially replicates the mold cavity that was used to form the shaped abrasive particle. Shaped abrasive particle as used herein excludes randomly sized abrasive particles obtained by a mechanical crushing operation.

Formed abrasive particles also include precision-shaped grain (PSG) mineral particles, such as those described in Published U.S. Appl. No. 2015/267097, which is incorporated by reference as if fully set forth herein.

Examples of suitable abrasive particles include, for example, fused aluminum oxide, heat treated aluminum oxide, white fused aluminum oxide, black silicon carbide, green silicon carbide, titanium diboride, boron carbide, silicon nitride, tungsten carbide, titanium carbide, diamond, cubic boron nitride, hexagonal boron nitride, garnet, fused alumina zirconia, alumina-based sol gel derived abrasive particles, silica, iron oxide, chromia, ceria, zirconia, titania, tin oxide, gamma alumina, and mixtures thereof. The alumina abrasive particles may contain a metal oxide modifier. The diamond and cubic boron nitride abrasive particles may be monocrystalline or polycrystalline.

In some examples, the formed abrasive particles have a substantially monodisperse particle size of from about 1 micrometers to about 5000 micrometers, from about 1 micrometers to about 2500, from about 1 micrometers to about 1000, from about 10 micrometers to about 5000, from about 10 micrometers to about 2500, from about 10 micrometers to about 1000, from about 50 micrometers to about 5000, from about 50 micrometers to about 2500, from about 50 micrometers to about 1000. As used herein, the term "substantially monodisperse particle size" is used to describe formed abrasive particles having a size that does not vary substantially. Thus, for example, when referring to formed abrasive particles (e.g., a PSG mineral particles) having a particle size of 100 micrometers, greater than 90%, greater than 95% or greater than 99% of the formed abrasive particles will have a particle having its largest dimension be 100 micrometers.

In some embodiments, the abrasive particles can have a range or distribution of particle sizes. Such a distribution can be characterized by its median particle size. For instance, the median particle size of the abrasive particles may be at least 0.001 micrometers, at least 0.005 micrometers, at least 0.01 micrometers, at least 0.015 micrometers, or at least 0.02 micrometers. In some instances, the median particle size of the abrasive particles may be up to 300 micrometers, up to 275 micrometers, up to 250 micrometers, up to 150 micrometers, or up to 100 micrometers. In some examples, the median particle size of the abrasive particles is from about 1 micrometers to about 600 micrometers, from about 1 micrometers to about 300 micrometers, from about 1 micrometers to about 150 micrometers, from about 10 micrometers to about 600 micrometers, from about 10 micrometers to about 300 micrometers, from about 10 micrometers to about 150 micrometers, from about 50 micrometers to about 600 micrometers, from about 50 micrometers to about 300 micrometers, from about 50 micrometers to about 150 micrometers.

In some examples, the abrasive particle of the present disclosure may include formed abrasive particles. The formed abrasive particles may be present from 0.01 wt. percent to 100 wt, percent, from 0.1 wt. percent to 100 wt, percent, from 1 wt. percent to 100 wt, from 10 wt. percent to 100 wt, percent, from 0.01 wt. percent to 90 wt, percent, from 0.1 wt. percent to 90 wt, percent, from 1 wt. percent to 90 wt, from 10 wt. percent to 90 wt, percent, from 0.01 wt. percent to 75 wt, percent, from 0.1 wt. percent to 75 wt, percent, from 1 wt. percent to 75 wt, from 10 wt. percent to 75 wt, percent, based on the total weight of the abrasive particles.

In some examples, the particulate mixture comprises from about greater than 90 wt. % to about 99 wt. % abrasive particles (e.g., from about 91 wt. % to about 97 wt. %; about 92 wt. % to about 97 wt. %; about 95 wt. % to about 97 wt. %; or greater than about 90 wt. % to about 97 wt. %).

In some embodiments, the abrasive article of the various embodiments described herein include a size coat 510. See FIG. 5. In some examples, the size coat comprises the cured product of a phenolic size composition. In other examples, the size coat comprises the cured (e.g., photopolymerized) product of a bis-epoxide (e.g., 3,4-epoxy cyclohexylmethyl-3,4-epoxy cyclohexylcarboxylate, available from Daicel Chemical Industries, Ltd., Tokyo, Japan); a trifunctional acrylate (e.g., trimethylol propane triacrylate, available under the trade designation "SR351" from Sartomer USA, LLC, Exton, PA); an acidic polyester dispersing agent (e.g., "BYK W-985" from Byk-Chemie, GmbH, Wesel, Germany); a filler (e.g., a sodium-potassium alumina silicate filler, obtained under the trade designation "MINEX 10" from The Cary Company, Addison, IL); a photoinitiator (e.g., a triarylsulfonium hexafluoroantimonate/propylene carbonate photoinitiator, obtained under the trade designation "CYRACURE CPI 6976" from Dow Chemical Company, Midland, MI; and an α-Hydroxyketone photoinitiator, obtained under the trade designation "DAROCUR 1173" from BASF Corporation, Florham Park, NJ).

In some embodiments, the abrasive article of the various embodiments described include a supersize coat 610. See FIG. 6. In general, the supersize coat is the outermost coating of the abrasive article and directly contacts the workpiece during an abrading operation. The supersize coat is, in some examples, substantially transparent.

The term "substantially transparent" as used herein refers to a majority of, or mostly, as in at least about 30%, 40%, 50%, 60%, or at least about 70% or more transparent. In some examples, the measure of the transparency of any given coat described herein (e.g., the supersize coat) is the coat's transmittance. In some examples, the supersize coat displays a transmittance of at least 5 percent, at least 20 percent, at least 40 percent, at least 50 percent, or at least 60 percent (e.g., a transmittance from about 40 percent to about 80 percent; about 50 percent to about 70 percent; about 40 percent to about 70 percent; or about 50 percent to about 70 percent), according to a Transmittance Test that measures the transmittance of 500 nm light through a sample of 6 by 12 inch by approximately 1-2 mil (15.24 by 30.48 cm by 25.4-50.8 μm) clear polyester film, having a transmittance of about 98%.

One component of supersize coats can be a metal salt of a long-chain fatty acid (e.g., a $C_{12}$-$C_{22}$ fatty acid, a $C_{14}$-$C_{18}$ fatty acid, and a $C_{16}$-$C_{20}$ fatty acid). In some examples, the metal salt of a long-chain fatty acid is a stearate salt (e.g., a salt of stearic acid). The conjugate base of stearic acid is $C_{17}H_{35}COO-$, also known as the stearate anion. Useful stearates include, but are not limited to, calcium stearate, zinc stearate, and combinations thereof.

The metal salt of a long-chain fatty acid can be present in an amount of at least 10 percent, at least 50 percent, at least 70 percent, at least 80 percent, or at least 90 percent by weight based on the normalized weight of the supersize coat (i.e., the average weight for a unit surface area of the abrasive article). The metal salt of a long-chain fatty acid can be present in an amount of up to 100 percent, up to 99 percent, up to 98 percent, up to 97 percent, up to 95 percent, up to 90 percent, up to 80 percent, or up to 60 percent by weight (e.g., from about 10 wt. % to about 100 wt. %; about 30 wt. % to about 70 wt. %; about 50 wt. % to about 90 wt. %; or about 50 wt. % to about 100 wt. %) based on the normalized weight of the supersize coat.

Another component of the supersize coat is a polymeric binder, which, in some examples, enables the supersize coat to form a smooth and continuous film over the abrasive layer. In one example, the polymeric binder is a styrene-acrylic polymer binder. In some examples, the styrene-acrylic polymer binder is the ammonium salt of a modified styrene-acrylic polymer, such as, but not limited to, JONCRYL® LMV 7051. The ammonium salt of a styrene-acrylic polymer can have, for example, a weight average molecular weight (Mw) of at least 100,000 g/mol, at least 150,000 g/mol, at least 200,000 g/mol, or at least 250,000 g/mol (e.g., from about 100,000 g/mol to about 2.5×106 g/mol; about 100,000 g/mol to about 500,000 g/mol; or about 250,000 to about 2.5×106 g/mol).

The minimum film-forming temperature, also referred to as MFFT, is the lowest temperature at which a polymer self-coalesces in a semi-dry state to form a continuous polymer film. In the context of the present disclosure, this polymer film can then function as a binder for the remaining solids present in the supersize coat. In some examples, the styrene-acrylic polymer binder (e.g., the ammonium salt of a styrene-acrylic polymer) has an MFFT that is up to 90° C., up to 80° C., up to 70° C., up to 65° C., or up to 60° C.

In some examples, the binder is dried at relatively low temperatures (e.g., at 70° C. or less). The drying temperatures are, in some examples, below the melting temperature of the metal salt of a long-chain fatty acid component of the supersize coat. Use of excessively high temperatures (e.g., temperatures above 80° C.) to dry the supersize coat is undesirable because it can induce brittleness and cracking in the backing, complicate web handling, and increase manufacturing costs. By virtue of its low MFFT, a binder comprised of, e.g., the ammonium salt of a styrene-acrylic polymer allows the supersize coat to achieve better film formation at lower binder levels and at lower temperatures without need for added surfactants such as DOWANOL® DPnP.

The polymeric binder can be present in an amount of at least 0.1 percent, at least 1 percent, or at least 3 percent by weight, based on the normalized weight of the supersize coat. The polymeric binder can be present in an amount of up to 20 percent, up to 12 percent, up to 10 percent, or up to 8 percent by weight, based on the normalized weight of the supersize coat. Advantageously, when the ammonium salt of a modified styrene acrylic copolymer is used as a binder, the haziness normally associated with a stearate coating is substantially reduced.

The supersize coats of the present disclosure optionally contain clay particles dispersed in the supersize coat. The clay particles, when present, can be uniformly mixed with the metal salt of a long chain fatty acid, polymeric binder, and other components of the supersize composition. The clay can bestow unique advantageous properties to the abrasive article, such as improved optical clarity and improved cut performance. The inclusion of clay particles can also enable cut performance to be sustained for longer periods of time relative to supersize coats in which the clay additive is absent.

The clay particles, when present, can be present in an amount of at least 0.01 percent, at least 0.05 percent, at least 0.1 percent, at least 0.15 percent, or at least 0.2 percent by weight based on the normalized weight of the supersize coat. Further, the clay particles can be present in an amount of up to 99 percent, up to 50 percent, up to 25 percent, up to 10 percent, or up to 5 percent by weight based on the normalized weight of the supersize coat.

The clay particles may include particles of any known clay material. Such clay materials include those in the geological classes of the smectites, kaolins, illites, chlorites, serpentines, attapulgites, palygorskites, vermiculites, glauconites, sepiolites, and mixed layer clays. Smectites in particular include montmorillonite (e.g., a sodium montmorillonite or calcium montmorillonite), bentonite, pyrophyllite, hectorite, saponite, sauconite, nontronite, talc, beidellite, and volchonskoite. Specific kaolins include kaolinite, dickite, nacrite, antigorite, anauxite, halloysite, indellite and chrysotile. Illites include bravaisite, muscovite, paragonite, phlogopite and biotite. Chlorites can include, for example, corrensite, penninite, donbassite, sudoite, pennine and clinochlore. Mixed layer clays can include allevardite and vermiculitebiotite. Variants and isomorphic substitutions of these layered clays may also be used.

As an optional additive, abrasive performance may be further enhanced by nanoparticles (i.e., nanoscale particles) interdispersed (e.g., in the clay particles) in the supersize coat. Useful nanoparticles include, for example, nanoparticles of metal oxides, such as zirconia, titania, silica, ceria, alumina, iron oxide, vanadia, zinc oxide, antimony oxide, tin oxide, and alumina-silica. The nanoparticles can have a median particle size of at least 1 nanometer, at least 1.5 nanometers, or at least 2 nanometers. The median particle size can be up to 200 nanometers, up to 150 nanometers, up to 100 nanometers, up to 50 nanometers, or up to 30 nanometers.

Other optional components of the supersize composition include curing agents, surfactants, antifoaming agents, biocides, and other particulate additives known in the art for use in supersize compositions.

The supersize coat can be formed, in some examples, by providing a supersize composition in which the components are dissolved or otherwise dispersed in a common solvent. In some examples, the solvent is water. After being suitably mixed, the supersize dispersion can be coated onto the underlying layers of the abrasive article and dried to provide the finished supersize coat. If a curing agent is present, the supersize composition can be cured (e.g., hardened) either thermally or by exposure to actinic radiation at suitable wavelengths to activate the curing agent.

The coating of the supersize composition onto, e.g., the abrasive layer can be carried out using any known process. In some examples, the supersize composition is applied by spray coating at a constant pressure to achieve a predetermined coating weight. Alternatively, a knife coating method where the coating thickness is controlled by the gap height of the knife coater can be used.

The term "about" as used herein can allow for a degree of variability in a value or range, for example, within 10%, within 5%, or within 1% of a stated value or of a stated limit of a range.

Unless specified otherwise herein, the term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Unless specified otherwise herein, the term "substantially no" as used herein refers to a minority of, or mostly no, as in less than about 10%, 5%, 2%, 1%, 0.5%, 0.01%, 0.001%, or less than about 0.0001% or less.

Values expressed in a range format should be interpreted in a flexible manner to include not only the numerical values explicitly recited as the limits of the range, but also to include all the individual numerical values or sub-ranges encompassed within that range as if each numerical value and sub-range were explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. In addition, it is to be understood that the phraseology or terminology employed herein, and not otherwise defined, is for the purpose of description only and not of limitation. Any use of section headings is intended to aid reading of the document and is not to be interpreted as limiting. Further, information that is relevant to a section heading may occur within or outside of that particular section. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods described herein, the steps can be carried out in any order without departing from the principles of the invention, except when a temporal or operational sequence is explicitly recited. Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

An abrasive article is presented. The abrasive article includes a fabric substrate comprising strands forming first void spaces between the strands, a laminate joined to the fabric substrate, a cured resin composition joined to the laminate opposite the fabric substrate, abrasive particles joined to the cured resin composition, and a plurality of second void spaces extending through the laminate coinciding with first void spaces in the fabric substrate.

The abrasive article may be implemented such that the laminate at least partially wraps around the strands to leave open the first and second void spaces.

The abrasive article may be implemented such that the laminate avoids the first void spaces when cured resin composition is absent above the first void spaces.

The abrasive article may be implemented such that the laminate extends over only the strands.

The abrasive article may be implemented such that the laminate covers the first void spaces when the cured resin composition is above the spaces.

The abrasive article may be implemented such that the cured resin composition supports the laminate above the first void spaces.

The abrasive article may be implemented such that the fabric substrate comprises: a first side joined to the laminate; and a second side opposite the first side.

The abrasive article may be implemented such that the second side includes one part of a two-part hook and loop attachment system.

The abrasive article may be implemented such that the fabric substrate encompasses a first surface area at least including a portion of a total surface area of the first side.

The abrasive article may be implemented such that the laminate extends over the first surface area and encompasses a second total surface area equal to the first total surface area.

The abrasive article may be implemented such that the cured resin composition is positioned within the first surface area and encompasses a third total surface area less than the second total surface area.

The abrasive article may be implemented such that the third total surface area is one of contiguous or non-contiguous.

The abrasive article may be implemented such that the resin has a higher melting point than the laminate.

The abrasive article may be implemented such that the laminate comprises a hot-meltable material.

The abrasive article may be implemented such that the hot-meltable material comprises a hot-meltable polyester.

The abrasive article may be implemented such that the cured resin composition comprises the cured product of a phenolic resin.

The abrasive article may be implemented such that the fabric substrate comprises a woven or knitted material.

The abrasive article may be implemented such that the abrasive particles comprise shaped abrasive particles.

The abrasive article may be implemented such that air flows through the article at a rate of at least 0.5 L/s, such that, when in use, dust can be removed from an abraded surface through the abrasive article.

A method of making an abrasive article is presented that includes joining a laminate to a fabric substrate, joining a curable resin composition to the laminate opposite the fabric substrate, and joining abrasive particles to the curable resin composition. The fabric substrate comprises strands forming first void spaces between the strands.

The method may also include curing the curable resin composition to provide a cured resin composition.

The method may be implemented such that the curing creates a plurality of second void spaces extending through the laminate coinciding with first void spaces in the fabric substrate.

A method of making an abrasive article is presented. The method includes joining a laminate to a fabric substrate. The method also includes joining a curable resin composition to the laminate opposite the fabric substrate. The method also includes joining abrasive particles to the curable resin composition. The fabric substrate comprises strands forming first void spaces between the strands.

The method may also include curing the curable resin composition to provide a cured resin composition.

The method may be implemented such that the curing creates a plurality of second void spaces extending through the laminate coinciding with first void spaces in the fabric substrate.

The method may be implemented such that the abrasive particles comprise agglomerate abrasive particles. The agglomerate abrasive particles comprise shaped abrasive particles.

The method may be implemented such that the agglomerate abrasive particles are shaped agglomerate abrasive particles. The shape comprises an nonagon, an octagon, a heptagon, a hexagon, a triangle, a parallelogram, a rhombus, a rectangle, a square, a pentagon, a circle, a oval, a heart, a cross, a arrow, a star, or a crescent.

The method may be implemented such that joining the abrasive agglomerates to the curable resin composition comprises depositing the abrasive agglomerates in a pattern.

The method may be implemented such that joining the abrasive agglomerates to the curable resin composition comprises depositing the abrasive agglomerates randomly.

An abrasive article is presented. The article includes a fabric substrate comprising a plurality of strands forming first void spaces between the strands. The article also includes an adhesive layer comprising adhesive bonded to the plurality of strands. The article also includes abrasive particles embedded within the adhesive layer.

The abrasive article may be implemented such that the adhesive layer comprises a heat activated adhesive.

The abrasive article may be implemented such that the abrasive particles are crushed abrasive particles, platey abrasive particles, formed abrasive particles, shaped abrasive particles, or partially shaped abrasive particles.

The abrasive article may be implemented such that the abrasive particles comprise agglomerate abrasive particles. The agglomerate abrasive particles comprise shaped abrasive particles.

The abrasive article may be implemented such that the agglomerate abrasive particles are shaped agglomerate abrasive particles. The shape comprises an nonagon, an octagon, a heptagon, a hexagon, a triangle, a parallelogram, a rhombus, a rectangle, a square, a pentagon, a circle, a oval, a heart, a cross, a arrow, a star, or a crescent.

The abrasive article may be implemented such that the abrasive agglomerates are embedded in the adhesive layer in a pattern.

The abrasive article may be implemented such that the abrasive agglomerates are embedded in the adhesive layer randomly.

A method of making an abrasive article is presented. The method includes applying an adhesive layer to a fabric substrate. The fabric substrate comprises strands forming first void spaces between the strands. The adhesive layer is applied such that adhesive adheres substantially only to the strands and does not substantially extend into the void spaces. The method also includes applying a plurality of abrasive particles to the adhesive layer such that the abrasive particles are partially embedded within the adhesive layer.

The method may be implemented such that the adhesive layer comprises a heat activated adhesive.

The method may be implemented such that applying an adhesive layer comprises laminating the fabric substrate with an adhesive layer.

The method may also include heating the adhesive layer.

The method may be implemented such that applying the plurality of abrasive particles comprises drop-coating the abrasive particles.

The method may be implemented such that the abrasive particles are heated.

The method may be implemented such that the adhesive layer is heated.

The method may also include comprising applying a size coat.

The method may also include applying a supersize coat.

The method may be implemented such that the abrasive particles comprise agglomerate abrasive particles. The agglomerate abrasive particles comprise shaped abrasive particles.

The method may be implemented such that the agglomerate abrasive particles are shaped agglomerate abrasive particles. The shape comprises an nonagon, an octagon, a heptagon, a hexagon, a triangle, a parallelogram, a rhombus, a rectangle, a square, a pentagon, a circle, a oval, a heart, a cross, a arrow, a star, or a crescent.

The method may be implemented such that applying the abrasive agglomerates to the adhesive layer comprises depositing the abrasive agglomerates in a pattern.

The method may be implemented such that applying the abrasive agglomerates to the adhesive layer comprises depositing the abrasive agglomerates randomly.

EXAMPLES

The examples described herein are intended solely to be illustrative, rather than predictive, and variations in the manufacturing and testing procedures can yield different results. All quantitative values in the Examples section are understood to be approximate in view of the commonly known tolerances involved in the procedures used. The foregoing detailed description and examples have been given for clarity of understanding only. No unnecessary limitations are to be understood therefrom.

Unless stated otherwise, all reagents were obtained or are available from chemical vendors such as Sigma-Aldrich Company, St. Louis, Missouri, or may be synthesized by known methods. Unless otherwise reported, all ratios are by dry weight.

Abbreviations for materials and reagents used in the examples are as follows:

| | |
|---|---|
| B7 | Phenolic resin obtained as PREFERE 80 5077A from Arclin, Mississauga, Ontario, Canada |
| GEO | anti-foam agent, obtained as GEO FM LTX from GEO Specialty Chemicals, Ambler, Pennsylvania |
| U0 | solvent free aliphatic polycarbonate polyurethane Alberdingk U6150 from ALBERDINGK BOLEY INC Greensboro, NC |
| Fil1 | Calcium Silicate obtained under trade designation "M400 WOLLASTOCOAT" from NYCO, Willsboro, New York. |
| Sic | silicon carbide, black, grade P1500, obtained from GNP Ceramics LLC, |

|  |  |
|---|---|
|  | Clarence Center, New York |
| D1 | Ethoxylated nonionic surfactant, obtained as DYNOL 604 from Air Products and Chemicals Inc., Allentown, Pennsylvania |
| Col | carbon black pigment, obtained as C-SERIES BLACK 7 LCD4115 from Sun Chemical Corporation, Cincinnati, Ohio |
| Fil2 | Silicon Dioxide Cabosil M5 from ET HORN CO, La Mirada California. |
| Ant | Synthetic Paraffin MP22 obtained from Micro powders Inc, Tarrytown, New York |
| AP320 | Fused and fired Aluminum oxide particles of size P320, produced by Triebacher, Austria |
| FAP ("Formed Abrasive Particles") | Formed abrasive particles were prepared according to the disclosure of U.S. Pat. No. 8,142,531 (Adefris et al.). The formed abrasive particles were prepared by molding alumina sol gel in equilateral triangle-shaped polypropylene mold cavities. The draft angle between the sidewall and bottom of the mold was 98 degrees. After drying and firing, the resulting formed abrasive particles were about 0.10 millimeter (side length) × 0.025 millimeter (thickness). The formed abrasive particles made as described above are used, for example, in 3M Cubitron II Hookit Clean Sanding abrasive disc 737U, grade 320+, available from 3M Company (St. Paul, Minnesota, USA). |

Example 1: Preparation of Laminated Loop Backing

Laminated Loop Backing Raw Materials

| | |
|---|---|
| NET MESH | Net Mesh GR150 H100 available from SitiP, S.p.A., Cene, Italy. |
| CLL ("Continuous Laminate Layer") | PE85-60 30610536 Hot melt web 48 inches wide (72 gsm) available from Bostik, Inc., Wauwatosa, Wisconsin. |

The net mesh was laminated to one layer of 72 gsm (grams per square meter) of CLL using a Steamfast SF-680 Digital Steam Press set to 140 degrees Celsius with approximately two seconds of contact time, this way creating a continuous layer on the net backing. It should be understood that the amount, type, or number of layers of CLL can be modified to adjust the end product performance.

Example 2: Phenolic Resin Preparation

The components of the phenolic resins used to prepare the abrasive articles described herein are listed in Table 1.

TABLE 1

| Components and percentages of phenolic mix. | |
|---|---|
| Ingredients | Wt. % |
| B7 | 55-75 |
| U0 | 1-10 |
| D1 | 0.005-0.02) |
| GEO | 0.0005-0.003 |
| Fil1 | 10-20 |
| Sic | 1-10 |
| Col | 0.1-0.5 |
| Fil2 | 1-5 |
| Ant | 1-10 |

A curable composition was prepared, under high speed dispersion, using a high shear blade between 600 rpm (revolutions per minute) to 900 rpm at room temperature, until a homogeneous mix was obtained, by blending B7 with U0, then under shear adding D1, GEO, Col1, Sic, Fil1, Ant and slowly adding Fil2.

Figure 7:
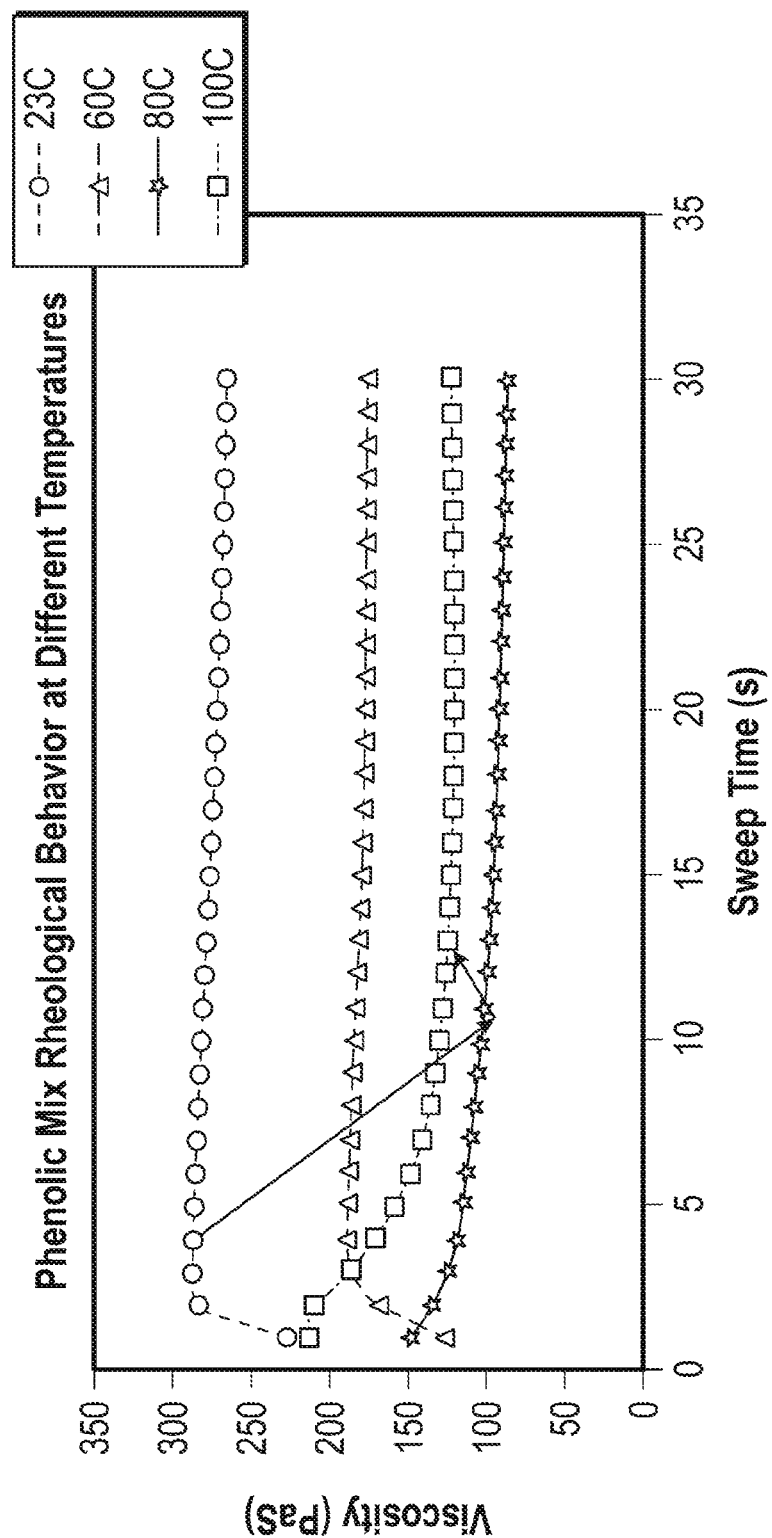
FIG. 7 is a plot of viscosity as a function of temperature for a phenolic resin of the various embodiments of the present disclosure.
Figure 8:
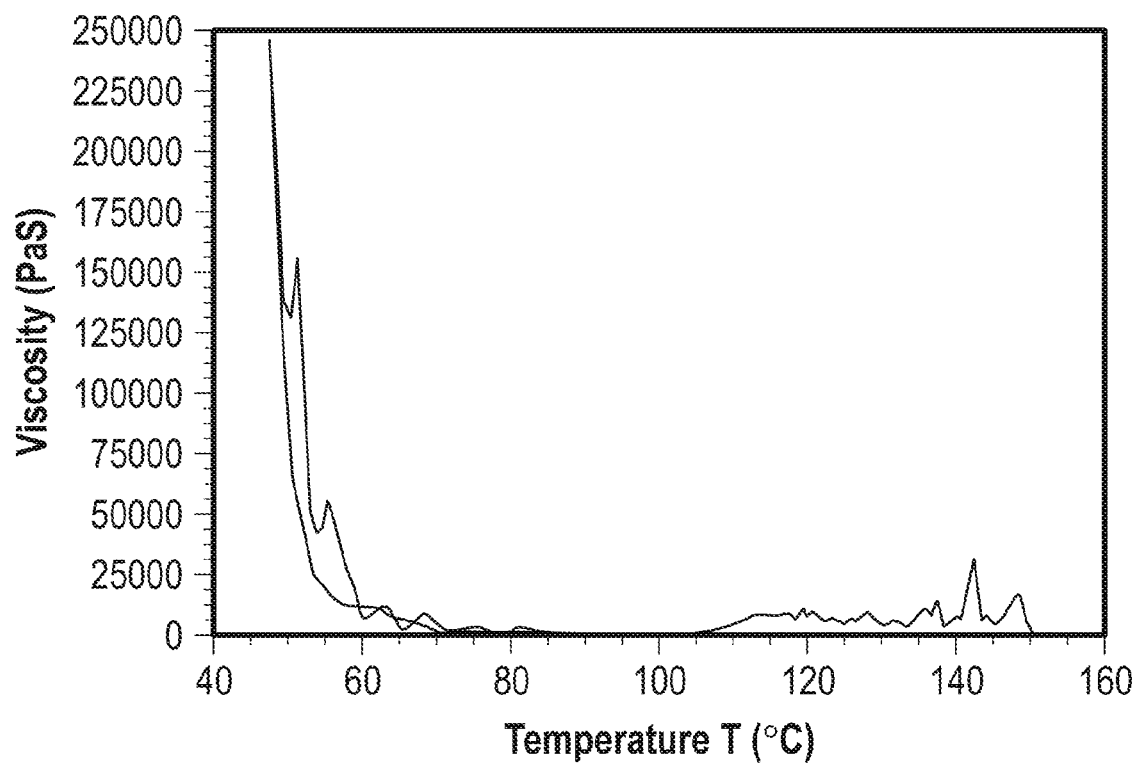
FIG. 8 is a plot of viscosity as a function of temperature for a phenolic resin of the various embodiments of the present disclosure.
Figure 9:
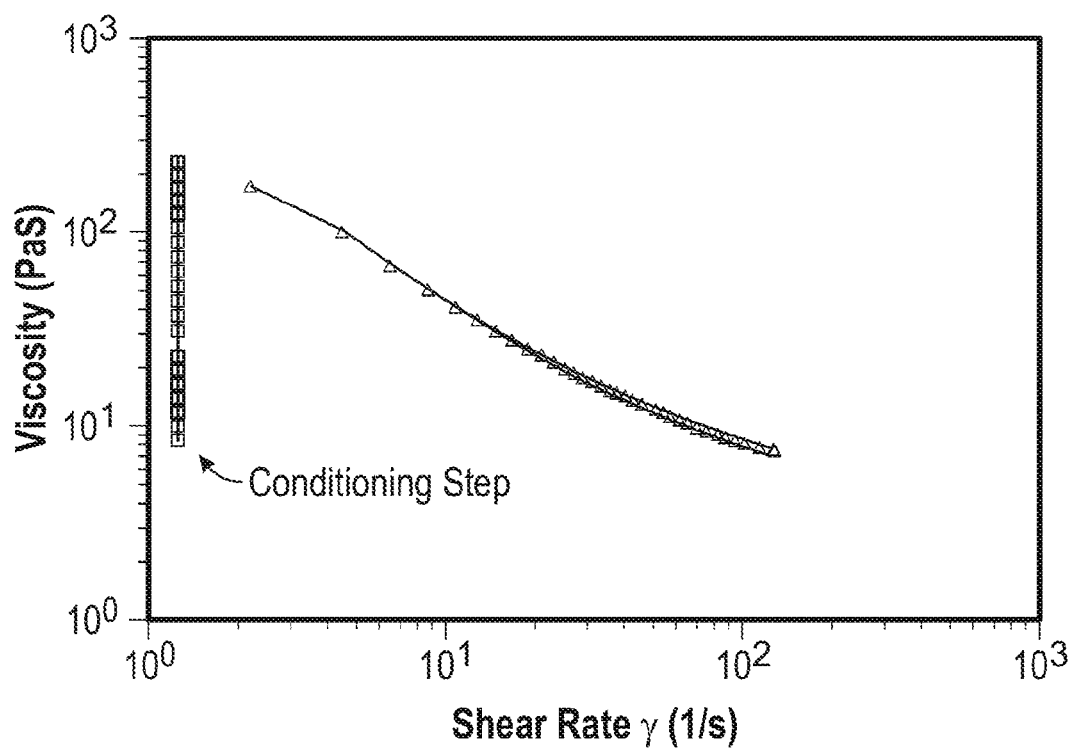
FIG. 9 is a plot of viscosity as a function of shear rate for a phenolic resin of the various embodiments of the present disclosure.

FIG. 7 shows the rheological behavior of the phenolic mixture containing the components listed in Table 1 at different temperatures. FIG. 8 shows temperature profile of viscosity at constant shear strain. FIG. 8 shows the viscosity value at 30° C. is 250,000 Pa·s and it drops at higher temperatures. There is still increase in viscosity after 110° C., due to curing reaction. FIG. 9 shows the effect of shear on viscosity of the phenolic mixture containing the components listed in Table 1. Shear thinning non-Newtonian behavior was observed under shear strain (often polymer resins show shear thinning in rheology). Temperature of experiment ~30° C.

Example 3: Stencil Printing Process

Using a patterned 3 mil polyester stencil film placed over the CLL on the backing described in Example 1, the curable composition described in Example 2 is stencil printed by bringing the backing and the stencil in contact, applying the curable composition to the side of the stencil opposite the backing, forcing the curable composition through the stencil with a blading mechanism, then separating the stencil and backing leaving a coating of the curable composition on the backing, the amount of curable composition coated is 100 gsm, having a film thickness of 75 microns. For this example, a pattern as shown in FIG. 12 was used. Then while the curable composition is still wet, 30 gsm blend of 50% P320 BFRPL and 50% FAP are electrostatically coated (Spellman SL 150). The entire construction is then thermally pre-cured in a batch oven at 80° C. for 30 minutes and final cured in a batch oven at 103° C. for four hours. During this final stage the curable composition is cured and the CLL melts, wicking onto the threads of the net mesh backing, reopening a number of the original holes of the backing. In this instance, a minimum 90% of original holes were reopened.

Example 4

Example 4 was made the same as Example 3, in this case 30 gsm blend of 70% P320 BFRPL Aluminum Oxide Mineral and 30% FAP were used.

Comparative Example 1

Comparative Example 1 was a 3M Cubitron™ II Hookit™ Purple Clean Sanding Disc 334U grade P320, available from 3M Company (St. Paul, Minnesota, US).

Comparative Example 2

Comparative Example 2 was a 9A-232-320 Mirka Abranet abrasive disc, grade P320, available from Mirka Ltd (Jeppo, Finland).

Comparative Example 3

Comparative Example 3 was a 3M Cubitron™ II Hookit™ Clean Sanding abrasive disc 737U, grade P320+, available from 3M Company (St. Paul, Minnesota, US).

Abrading Test Method

Abrasive performance of the abrasive articles made according to Example 3 and 4 and Comparative Examples 1-3 was evaluated on 18 inch by 24 inch (45.7 centimeter by 61 centimeter) black painted cold roll steel test panels having NEXA OEM type clearcoat, obtained from ACT Laboratories, Inc., Hillsdale, Michigan. For testing purposes, the abrasive discs in 6-inch diameter were attached to a 6-inch (15.2 centimeter) backup pad, commercially available under the trade designation "HOOKIT BACKUP PAD, PART NO. 05865," from 3M Company. The tool was disposed over an X-Y table, with the test panel secured to the X-Y table.

For testing purposes, the abrasive discs were attached to the backup pad. Sanding was performed using a dual action axis of a servo-controlled motor, disposed over an X-Y table, operating at 6,000 rpm, and 3/16-inch (4.76 millimeter) stroke, and the abrasive article urged at an angle of 2.5 degrees against the panel at a load of 13 lbs. (5.90 kilograms). An area of 9 inches×24 inches was sanded on the test panel in the following manner. The tool was set to traverse in the X direction along the 24 inch width of the panel at the rate of 2.53 inches/second (6.43 centimeter/second). The tool was indexed up in the Y direction at the rate of 20.0 inches/second (50.8 centimeter/second) along the height of the panel, and the pass was repeated in the negative X direction. Seven such passes along the width of the panel were completed, covering an area of 9 inches×24 inches for each cycle such that each cycle comprised 1 minute of sanding. A total of 4 cycles were run for each abrasive disc that was tested; each cycle was run on a new section of panel. The mass of the panel was measured before and after each cycle to determine the mass loss from the OEM panel in grams after each cycle. Total cut was determined as the cumulative mass loss at the end of the test. See Table 2. Cut life was calculated by ratio of last-minute cut divided by first minute cut for all samples.

TABLE 2

Cut 4 cycles, 60 seconds per cycle, Total cut and Cut life

| Sample | Cut 1 (grams) | Cut 2 (grams) | Cut 3 (grams) | Cut 4 (grams) | Total Cut (grams) | Cut-Life |
|---|---|---|---|---|---|---|
| Comparative Example 1 | 4.41 | 2.41 | 1.239 | 0.78 | 8.98 | 0.176 |
| Comparative Example 2 | 2.26 | 0.78 | 0.32 | 0.22 | 3.57 | 0.095 |
| Comparative Example 3 | 5.82 | 3.76 | 2.30 | 1.31 | 13.18 | 0.225 |
| Example 3 | 7.19 | 5.66 | 4.63 | 3.92 | 21.4 | 0.545 |
| Example 4 | 5.94 | 4.62 | 3.78 | 3.16 | 17.5 | 0.532 |

It will be apparent to those skilled in the art that the specific structures, features, details, configurations, etc., that are disclosed herein are simply examples that can be modified and/or combined in numerous embodiments. All such variations and combinations are contemplated by the inventor as being within the bounds of this disclosure. Thus, the scope of the disclosure should not be limited to the specific illustrative structures described herein, but rather extends at least to the structures described by the language of the claims, and the equivalents of those structures. To the extent that there is a conflict or discrepancy between this specification as written and the disclosure in any document incorporated by reference herein, this specification as written will control. Furthermore, all publications, patents, and patent documents referred to in this document are incorporated by reference herein in their entirety, as though they were fully set forth herein.

Example 5

A lab oven (Blue M Electric Company, Model POM-1406G-1, Blue Island, Illinois) was pre-heated to 160 C. A 9×11 inch (23 cm×28 cm) size mesh backing with hot melty layer was kept in the oven at 150-155 C for about 1 minute to allow melty layer melting to open the holes. Then the mesh backing was taken out from the oven and cooled down to room temperature. The mesh back was fixed on a smooth glass surface with 2-inch-wide masking tape with the loop side facing the glass surface.

94 g p 100 grade crushed zirconia alumina grain (commercially available from Washington Mills Electro Minerals, Niagara Falls, New York) was preheat to 150-155 C, and kept in the oven at 150-155 C for 5 minutes, and then drop-coated onto the mesh backing immediately. As a result, the abrasive grains were partially embedded in the melty adhesive.

The sample was cooled down to room temperature. The mineral coated mesh was nipped with an ultrasonication horn to remove residual grains. The horn was oscillated at a frequency of 19100 Hz at an amplitude of about 130 micrometers. The horn was composed of 6-4 titanium and was driven with a 900 watt 184V Branson power source coupled with a 2:1 Booster 802 piezoelectric converter. After passing the ultrasonic horn, only the grains stick to the melty remain on the mesh backing. This resulted in the sample of FIG. 15A. The mineral coated mesh could be further coated with size or supersize coatings.

Example 6

A lab oven (Blue M Electric Company, Model POM-1406G-1, Blue Island, Illinois) was pre-heated to 160 C. A 9×11 inch (23 cm×28 cm) size mesh backing with hot melty layer was kept in the oven with the no-loop size facing up at 150-155 C for about 1 minute to allow melty layer melting to open the holes, and then the mesh backing was kept at 150-155 C for 1 more minute to fully melt/soften the melty adhesive.

About 58 g P150 grade precision shaped abrasive grains were drop-coated onto the mesh backing within the oven and then the mesh backing together with the mineral was kept at 150-155 C for about 1 minute and then moved out of the oven and cooled down to room temperature.

The mineral coated mesh was nipped with an ultrasonication horn to remove residual grains. The horn was oscillated at a frequency of 19100 Hz at an amplitude of about 130 micrometers. The horn was composed of 6-4 titanium and was driven with a 900 watt 184V Branson power source coupled with a 2:1 Booster 802 piezoelectric converter.

After passing the ultrasonic horn, only the grains stick to the melty remain on the mesh backing. This resulted in the sample of FIG. 15B. The mineral coated mesh can be further coated with size or supersize coatings.

Example 7

A stencil with star-shaped patterns was used to make the star-shaped agglomerates.

A stencil with star-shaped patterns was fixed onto a piece of release liner (commercially available from 3M Company, Saint Paul, MN, with Designated brands 3M™ Silicone Secondary Release Liner 4997) with 2-in-wide masking tape. A bonding resin mix comprising 60 g tris-(2-hydroxyethyl)-isocyanurate triacrylate (designated as SR368 available from Sartomer Co., Exton, Pennsylvania), 0.6 g photoinitiator (designated as Irgacure 369, available from BASF Corp., Florham Park, New Jersey), and 39.4 g potassium fluoroborate (supplied by AWSM Industries, Paramus, New Jersey) was pattern coated onto the release liner through the stencil. The stencil was removed from the release liner and then a blend mineral comprising 10 parts P220 grade triangle shaped abrasive grains and 90 parts P220 grade crushed alumina oxide grains (available from Imerys, Paris, France) was drop-coated onto the pattern coated release liner surface. The release liner together with the coated resin and mineral were cured by passing through a model #DRE 410 Q UV-curing chamber (Fusion UV Systems, Gaithersburg, Maryland) equipped with two 600 watt "D-type" Fusion lamps set on high power. The cured star-shaped abrasive agglomerate was released from the liner. This resulted in the samples of FIGS. 17A-17B.

Example 8

The same procedure as Example was used except that a stencil with hexagonal shaped pattern was used. This resulted in the samples of FIGS. 17C-17D.

What is claimed is:

1. An abrasive article comprising:
    a fabric substrate comprising strands forming first void spaces between the strands;
    a laminate joined to the fabric substrate;
    a cured resin composition joined to the laminate opposite the fabric substrate, wherein the laminate covers a first portion of the first void spaces, and wherein the cured resin composition is above the first portion of the first void spaces;
    abrasive particles joined to the cured resin composition; and
    a plurality of second void spaces extending through the laminate and coinciding with a second portion of the first void spaces in the fabric substrate.

2. The abrasive article of claim 1, wherein the laminate at least partially wraps around the strands to leave open the second portion of the first void spaces and the second void spaces.

3. The abrasive article of claim 1, wherein the laminate avoids the second portion of the first void spaces when cured resin composition is absent above the first void spaces.

4. The abrasive article of claim 1, wherein the fabric substrate comprises:
    a first side joined to the laminate; and
    a second side opposite the first side, wherein the second side includes one part of a two-part hook and loop attachment system.

5. The abrasive article of claim 1, wherein the cured resin composition has a higher melting point than the laminate.

6. The abrasive article of claim 1, wherein the abrasive particles comprise shaped abrasive particles.

7. The abrasive article of claim 1, wherein the abrasive particles comprise agglomerate abrasive particles, and wherein the agglomerate abrasive particles comprise shaped abrasive particles.

8. The abrasive article of claim 7, wherein the agglomerate abrasive particles are arranged in a pattern on the fabric substrate.

9. A method of making the abrasive article of claim 1, the method comprising:
    joining the laminate to the fabric substrate, wherein the fabric substrate comprises strands forming first void spaces between the strands;
    joining a curable resin composition to the laminate opposite the fabric substrate;
    joining abrasive particles to the curable resin composition; and
    curing the curable resin composition to provide the cured resin composition.

10. The method of claim 9, wherein the curing creates the plurality of second void spaces extending through the laminate coinciding with the second portion of the first void spaces in the fabric substrate.

11. The abrasive article of claim 1, wherein the cured resin composition comprises the cured product of a phenolic resin.

12. The abrasive article of claim 1, wherein the laminate comprises a hot-meltable material.

13. The abrasive article of claim 1, wherein the laminate has a melting temperature that allows it to melt at a cure temperature of the cured resin composition.

14. An abrasive article comprising:
    a fabric substrate comprising strands forming first void spaces between the strands;
    a laminate joined to the fabric substrate;
    a cured product of a resin joined to the laminate opposite the fabric substrate;
    abrasive particles joined to the cured resin composition; and
    a plurality of second void spaces extending through the laminate coinciding with the first void spaces in the fabric substrate, wherein the resin has a higher melting point than the laminate.

15. The abrasive article of claim 14, wherein the cured product of the resin comprises the cured product of a phenolic resin.

16. The abrasive article of claim 14, wherein the laminate at least partially wraps around the strands to leave open the first and second void spaces.

17. The abrasive article of claim 14, wherein the laminate comprises a hot-meltable material.

18. The abrasive article of claim 14, wherein the fabric substrate comprises:
    a first side joined to the laminate; and
    a second side opposite the first side, wherein the second side includes one part of a two-part hook and loop attachment system.

19. The abrasive article of claim 14, wherein the abrasive particles comprise shaped abrasive particles.

* * * * *